Nov. 30, 1965 R. E. ARSENEAU ETAL 3,221,105

ELECTRONIC SWITCHING TELEPHONE SYSTEM

Filed March 22, 1962 14 Sheets-Sheet 1

INVENTOR.
R.E. ARSENEAU
J. BEREZNAK
P.E. OSBORN

BY J. Warren Whitesel

ATTORNEY

| TRUTH TABLE A | | |
|---|---|---|
| INPUT | OUTPUT | |
| | A | B |
| 0 | 1 | 0 |
| 1 | 0 | 1 |

Nov. 30, 1965 R. E. ARSENEAU ETAL 3,221,105

ELECTRONIC SWITCHING TELEPHONE SYSTEM

Filed March 22, 1962

14 Sheets-Sheet 6

Nov. 30, 1965 R. E. ARSENEAU ETAL 3,221,105

ELECTRONIC SWITCHING TELEPHONE SYSTEM

Filed March 22, 1962

14 Sheets-Sheet 8

Nov. 30, 1965 R. E. ARSENEAU ETAL 3,221,105

ELECTRONIC SWITCHING TELEPHONE SYSTEM

Filed March 22, 1962 14 Sheets-Sheet 10

Nov. 30, 1965 R. E. ARSENEAU ETAL 3,221,105

ELECTRONIC SWITCHING TELEPHONE SYSTEM

Filed March 22, 1962

14 Sheets-Sheet 13

United States Patent Office 3,221,105

Patented Nov. 30, 1965

3,221,105

ELECTRONIC SWITCHING TELEPHONE SYSTEM

Roger E. Arseneau, John Bereznak, and Peter E. Osborn, Chicago, Ill., assignors to International Telephone and Telegraph Corporation, New York, N.Y., a corporation of Maryland Filed Mar. 22, 1962, Ser. No. 181,626

41 Claims. (Cl. 179—18)

This invention relates to electronic switching telephone systems and more particularly to systems using self-seeking crosspoint switching networks.

The switching network used in this invention may be described as a "space-division" network of crosspoint switches. This means that a plurality of conversations may be carried out simultaneously over separate paths which are physically separated from each other by space. This term "space-division" is used for convenience of expression to distinguish this type of network from other types of networks for carrying simultaneous conversations. For example, a "frequency-division" (carrier system) network transmits many simultaneous conversations over the same path through space with each conversation modulated on a different carrier wave. Likewise, in "time-division" systems, many different conversations are interlaced in time slots carried by the same path through space. For a disclosure of an exemplary space division system of the described type, reference is made to a co-pending U.S. patent application, entitled, "Electronic Switching Matrix," Serial No. 145,220, filed October 16, 1961, by John Bereznak. Both this and the co-pending Bereznak applications are assigned to the same assignee.

Originally, automatic telephone switching systems included electromechanical devices for completing connections between subscriber lines under the control of subscriber transmitted dial pulses. Because of the size, inertia, and inherent slowness of these electromechanical devices, great efforts have been made to develop electronic counterparts which operate at an extremely high rate of speed. The above identified Bereznak crosspoint matrix is one of these electronic developments. In that matrix, connections are completed between subscriber lines via self-seeking paths extended through crosspoints in the matrix without requiring complex control equipment to select the crosspoints. After one such path is completed, all other self-seeking paths are blocked automatically. The number of crosspoints required in the matrix to complete this path is fixed by the "grade of service" given to subscribers.

The term "grade of service" is used in telephony to identify the number of calls that are lost due to traffic congestion. In greater detail, if every subscriber in a system has a private switchtrain with direct access to every other subscriber in that system, no calls would be lost due to office traffic congestion. This however, is inefficient because no subscriber uses his telephone twenty-four hours a day. Nor does any subscriber call all other subscribers. Therefore, subscribers usually share a relatively small common pool of switching equipment. With this sharing it is possible that more calls will place a simultaneous demand upon that common equipment that can be handled by the available facilities. Thus, the equipment will handle as many calls as can be served and allow the other calls to fail or wait for lack of available equipment. In a high grade of service, few calls fail; in a low grade of service, many calls fail.

When a crosspoint matrix, such as the Bereznak matrix, is used, a phenomenon called "internal-blocking" sometimes causes deterioration in the grade of service. That is, calls fail not because all equipment is busy, but because congestion in switching stages precludes seizure of the idle equipment. To avoid internal blocking, it is common practice to provide a relatively great number of crosspoints. This insures access to idle equipment despite previous operation of many crosspoints. Needless to say, there are economic advantages if a high factor of internal-blocking can be tolerated. Heretofore, such high internal-blocking could not be tolerated, however, because it means a low grade of service.

Aside from the cost of the matrix, which goes up sharply with the increased number of crosspoints, there is a more serious problem if electronic switches are used for crosspoints because crosstalk increases with the size of the matrix. Therefore, any reduction in a number of crosspoints required in a matrix represents a substantial step forward in the art, especially if such reduction is accomplished without loss in the grade of service.

Accordingly, an object of this invention is to provide new and improved electronic switching telephone systems.

Another object of the invention is to provide electronic switching systems utilizing crosspoint switching networks having a minimum number of crosspoints. In this connection, an object of the invention is to use networks having high internal-blocking factors without allowing deterioration in the grade of service furnished by the system.

Another object of the invention is to combine the best features of switching systems incorporating spaced apart switching elements and systems operated on a time control basis. Here, an object is to provide a variable time control for minimizing the number of spaced apart switching elements required in the system without allowing deterioration in the grade of service.

Another object is to further increase the capabilities of telephone systems by giving special service on particular calls without materially increasing the size of the system.

In accordance with one aspect of this invention, an electronic switching telephone system includes at least one self-seeking crosspoint switching network for interconnecting a plurality of subscriber lines, link circuits, and registers. The lines, which are identified by time slots, are scanned continuously for unanswered calling conditions. The registers are also scanned, but on the basis of one step for each completed line scan. Upon detection of an unanswered calling condition on any line, the register then being scanned is assigned to receive and store both calling and called numbers. After both numbers are stored, the line scanning is stopped and a self-seeking path is fired through the matrix. If internal-blocking occurs while the path fires through the matrix, another path attempts to fire. Thus, the entire system merely stands and tries repeatedly to complete a call through the matrix. Eventually, a path does succeed and only then is a link committed to serve that call. Thereafter, the line scanning is resumed. In this manner, internal-blocking does not cause deterioration in the grade of service given by the overall system.

The above mentioned and other features and objects of this invention and the manner of obtaining them will become more apparent and the invention itself will be best understood by reference to the following description of an embodiment of the invention, taken in conjunction with the accompanying drawings in which.

GENERAL DESCRIPTION

Figure 1:
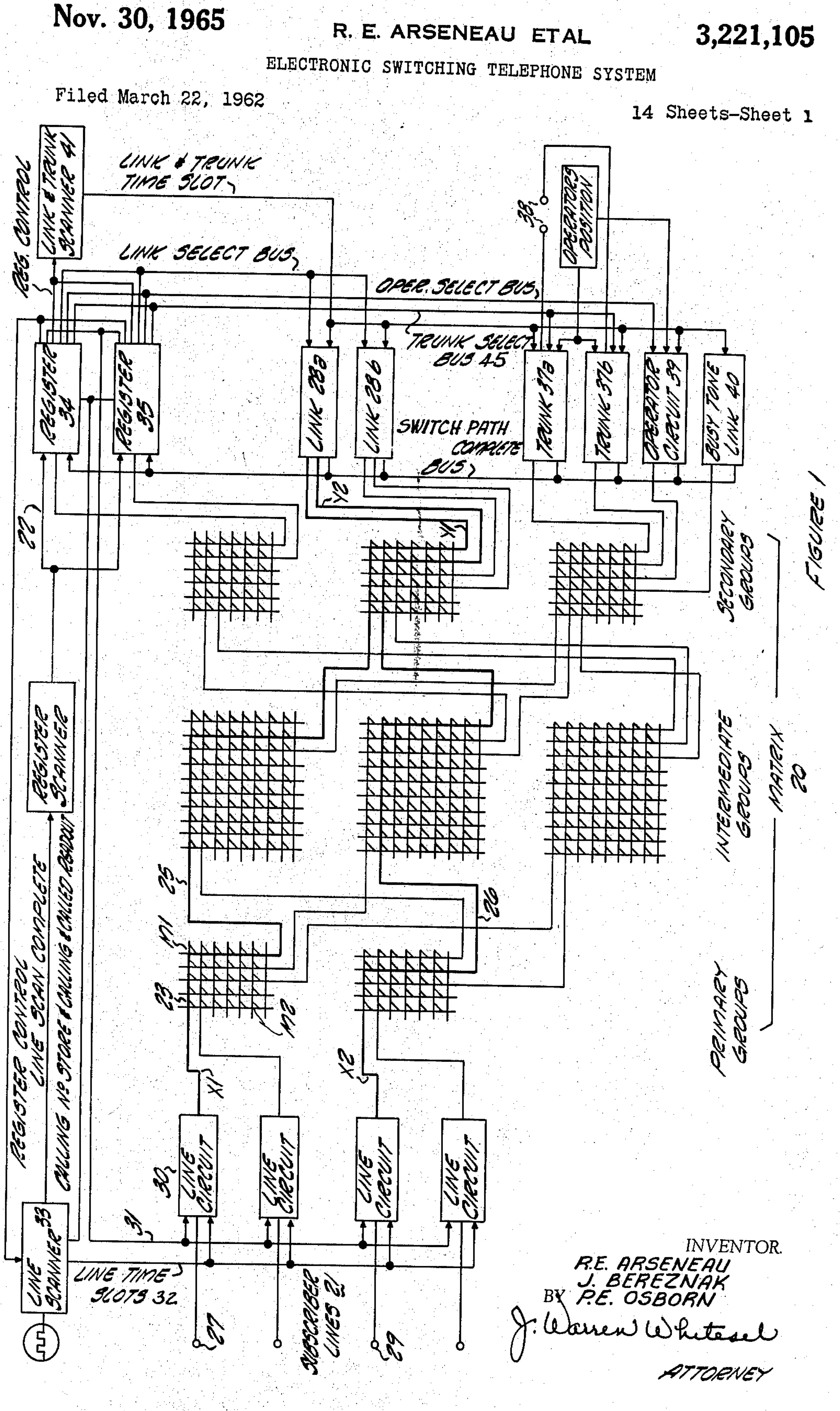
FIG. 1 shows a telephone system through the use of a block diagram.

FIG. 1 is a block diagram showing an exemplary electronic switching telephone system incorporating the principles of the invention. The system includes a space division network 20 of crosspoint switches having subscriber lines 21 connected to one side and control equipment 22 connected to the other side.

The matrix is a self-seeking device including a combination of spaced-apart switching element (one of which is shown at 23) for extending connections from the line side to the link side of the matrix. The matrix includes first and second (or horizontal and vertical) intersecting multiples, two of which are shown at M1, M2. These multiples (which may be conductor busses) are arranged to provide a number of crosspoints, each of which includes an electronic switch 23 (such as a PNPN diode) for electrically connecting the intersecting multiples when the diode is switched "on" and electrically isolating the intersecting multiples when the diode is switched "off." As those familiar with PNPN diodes know, the diode switches "on" or fires when a voltage in excess of a firing potential is applied across its terminals. Thereafter, the current must flow through it to hold it "on." If this current flow terminates, the diode switches "off." After one diode switches "off," assuming that the firing potential remains, another diodes switches "on." In this way, the diodes switch "on" and "off" in a random manner until a self-seeking path finds its way through the matrix and a holding current flows.

If, for example, end marking potentials are applied at points X1, Y1, a self-seeking path may race through the matrix over the connections 25 represented by heavily inked lines. In like manner, if end marking potentials are applied at points X2, Y2, another path may extend over the connections 26 also represented by heavily inked lines. If the path 25 represents a connection between a calling line 27 and control equipment (link 28) and the path 26 represents a connection between a called line 29 and the same control equipment, it is only necessary for the control equipment to join the point Y1, Y2 to complete a talking path from line 27 to line 29.

The subscriber lines are connected to the line side of the matrix by way of individually associated line circuits (as shown at 30). The line circuits provide an electrical indication when a subscriber line is off-hook either to seize a link or to give a busy marking. The line circuit also provides a conduit for transmitting dial pulses from a calling subscriber line to the control equipment and for applying ringing current to a called line. Additionally, the line circuit may provide special services when energized over a special conductor 31.

Each line circuit is individually identified by time slot pulses applied to common control conductors 32 from a line scanner 33. The line scanner is driven from a common source of pulses such as a free running multivibrator, for example. Each line identifying time slot provides for enabling line seizure. Thus, by halting this line scanner during a given time slot, the matrix is allowed enough time to fire an adequate number of paths through the matrix to overcome any internal-blocking. This prevents deterioration in the grade of service given by the system.

Each register 34, 35 includes means for storing an identification of both calling and called subscriber line numbers. Thus, the register may cause each of many links to try, in turn, to complete a connection through the matrix. This way, no one link is committed to any given call until after it is known that that particular link can complete the call. This also allows reduction in the number of crosspoints in the matrix without deterioration of the grade of service.

Each link (one of which is shown at 28) includes means for end marking access points to the matrix and for providing an audio path when a call is completed through the matrix. After a path is so completed, the link commands the register to release. Various trunk circuits (shown at 37*a*, 37*b*) provide the functions of a link, and any additional functions required to reach a distant office over outgoing trunks 38. Another trunk circuit 39 extends calls to an "operator's position." Finally, a busy trunk circuit 40 provides for the transmission of busy tone signals to a calling subscribed if a call is not completed. Each link and trunk circuit is identified by an individually associated time slot applied from a link and trunk scanner 41 under control of the common source of slot pulses.

Upon reflection, it will be apparent that spaced-apart switches such as 23 are controlled on a time division basis to complete calls. That is, lines, registers and links are identified by individually associated time slot pulses. The lines are identified by time slots of "T" duration. The duration of each link time slot is (2T) twice the duration of each line time slot, and the duration of each register time slot is equal to the sum of the duration of all line time slots. That is, if there are "N" lines the duration of a register time slot is "NT." As we shall learn, the link tries to fire to a calling line during the first (or "odd") half (T) of its (2T) time slot and to the called line during the second (or "even") half (T) of its (2T) time slot. If successful, the register is released. If unsuccessful, the next link tries. Therefore, the interaction of these time slot controls over the matrix switching allows a compensation for internal-blocking which preserves the grade of service despite the failure of any one path due to blocking.

In the description which follows, the electrical circuitry required to complete the telephone system of FIG. 1 is explained through the use of logic symbols. Although conventional symbols are used, it may be well to explain these symbols at this point in the specification because the electronics industry has adopted many conventions.

Briefly, an "OR" gate is shown by a semi-circle including a number of input terminals which intersect the cord thereof. When any one or more of the input terminals is energized, a signal appears at the output terminal.

An "AND" gate is shown by a semi-circle having a number of input terminals which touch the cord. When all of the input terminals are energized simultaneously, a signal appears at the output terminal.

An inhibit gate is shown as a semi-circle having input, inhibit and output leads. Any signals appearing on the input lead, appear at the output lead unless the inhibit lead (marked by a heavily inked dot) is then energized. If so, no signals may reach the output conductor.

A flip-flop circuit is shown by a segmented rectangle including the letters "A" and "B." Normally, the flip-flop circuit stands on its "A" side, and the output conduct or is de-energized. If a signal appears on the "trigger" lead, the flip-flop output switches to the "B" side to energize the output conductor. The signal remains on the output conductor until the reset lead is energized to return the flip-flop to its "A" side.

A flip-flop circuit is shown as a segmented rectangle having a shaded and unshaded side. The output from the shaded side is indicated by a symbol having a bar superscript ($\overline{A}$) and the output from the unshaded side is shown by an unbarred symbol (A). When a "set" lead is energized, the flip-flop circuit switches from whatever state it is then in to the opposite state. Thus, if the flip-flop is standing on its $\overline{A}$ side, an appearance of an input signal on the "set" lead causes an output signal on the "A" side. If either of the "reset" leads is energized, the flip-flop switches to give an output signal on that side.

A "NOR" gate is shown by a multi-input triangle having a slash mark at its apex. If none of the input terminals are energized, an output signal appears. If any one or more of the input terminals is energized, the output signal disappears.

An inverter is shown by a single input triangle having a slash mark near the apex. An "on" input signal causes an "off" output signal and vice versa.

Figure 2:
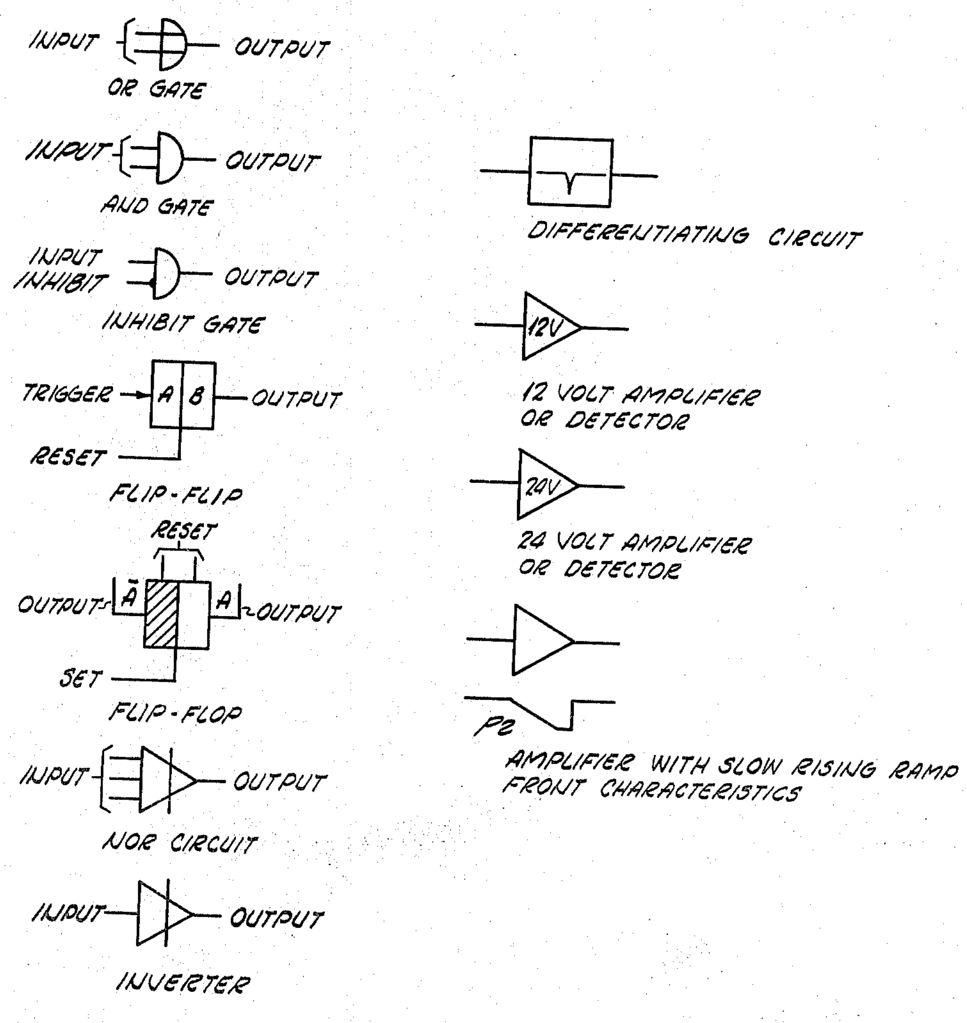
FIG. 2 shows the logic symbols used in FIGS. 3–10.
Figure 2:
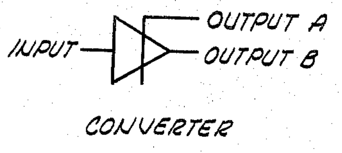

A converter is shown by a triangle having two output terminals, one being taken from the apex of the triangle and the other from a slash mark near the apex. The input-output relation of a converter circuit is shown in the Truth Table A of FIG. 2. Thus, a "0" input signal produces a "1" output at terminal "A," and a "0" output at terminal "B." A "1" input signal produces a "0" output at terminal "A," and a "1" output at terminal "B."

A differentiating circuit is shown by a block including a spike pulse wave form. Any input signal produces a spike pulse output.

Three amplifiers with special output characteristics are shown by small triangles. A first of these triangles encloses "12V" to indicate that the amplifier output is a 12 volt pulse or that the amplifier is triggered to conductivity by a 12 volt input pulse. A second triangle, including "24V" indicates that the amplifier produces a 24 volt pulse or switches "on" responsive to the receipt of a 24 volt pulse. The third triangle is shown adjacent a pulse form P having a slow rising, negative going, ramp front wave form. This amplifier has characteristics which produce a pulse shown generally by the wave form P.

DETAILED DESCRIPTION

Figure 3:
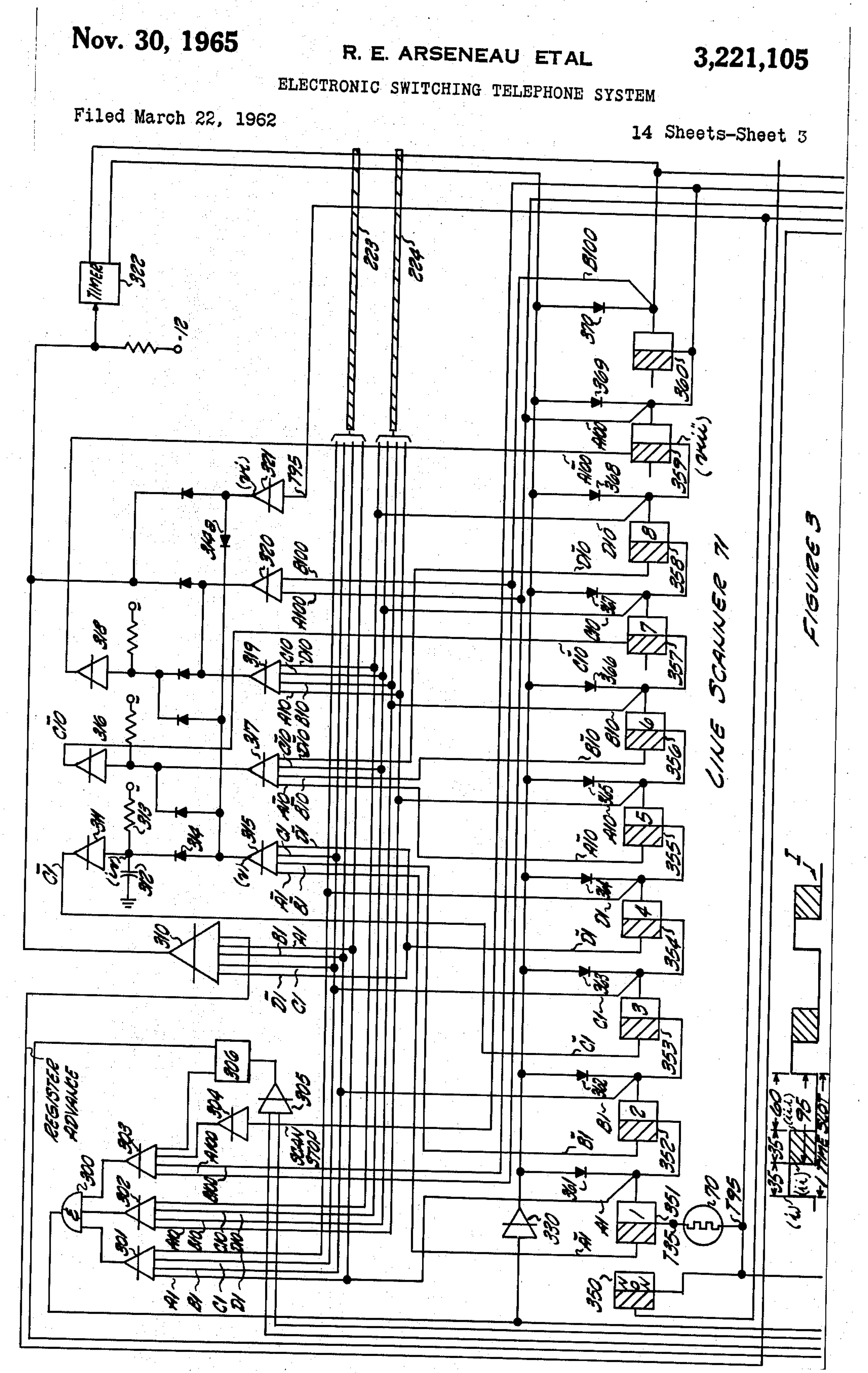
FIGS. 3–10 show, by logic diagram, the system of FIG. 1.
Figures 3, 4, 5, 6, 7, 8, 9, 10, 11:
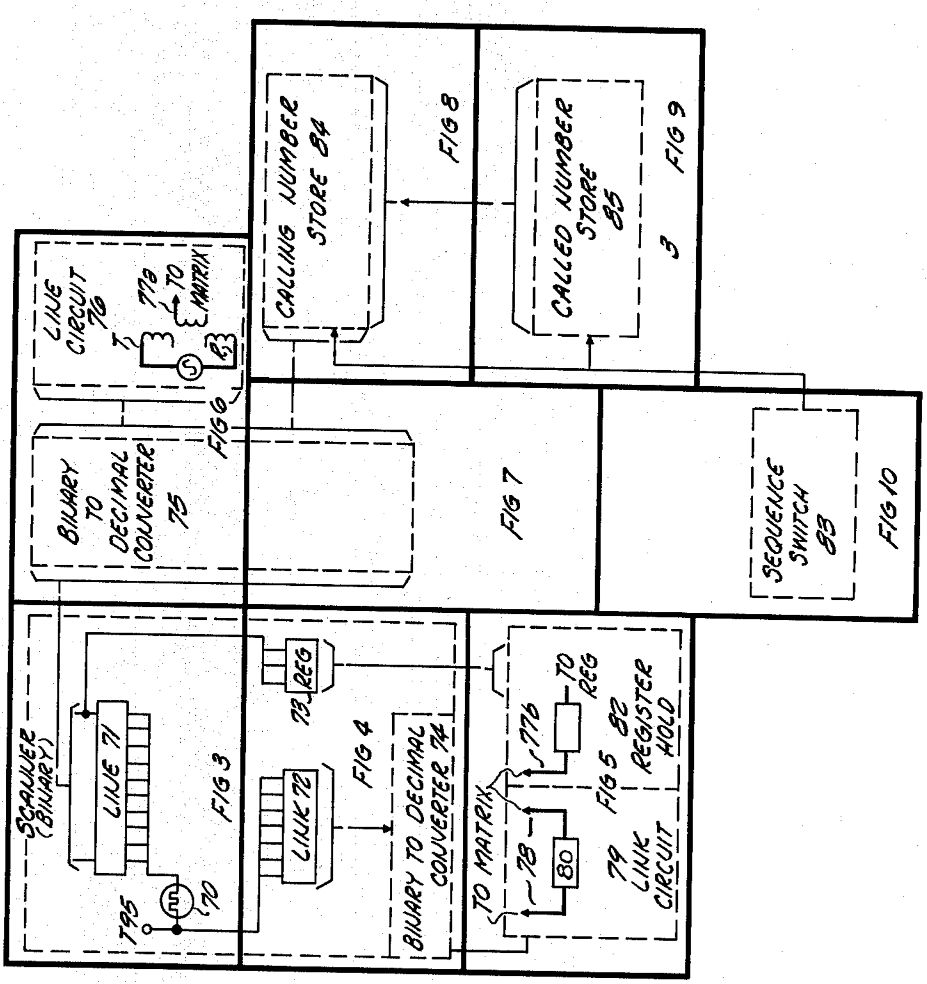
FIG. 11 shows how FIGS. 3–10 should be joined to provide a complete circuit diagram.

FIG. 11 serves the dual function of telling the reader how to join FIGS. 3–10 to provide a complete and understandable circuit and of indicating the major subdivision of FIGS. 3–10. More particularly, these major subdivisions include a common, free running pulse source 70 which drives a line scanner 71, a link scanner 72 and a register scanner 73. Since all information in the scanner is in a binary code form, the outputs of the line and link scanners are fed through binary to decimal converters 74, 75.

Figure 5:
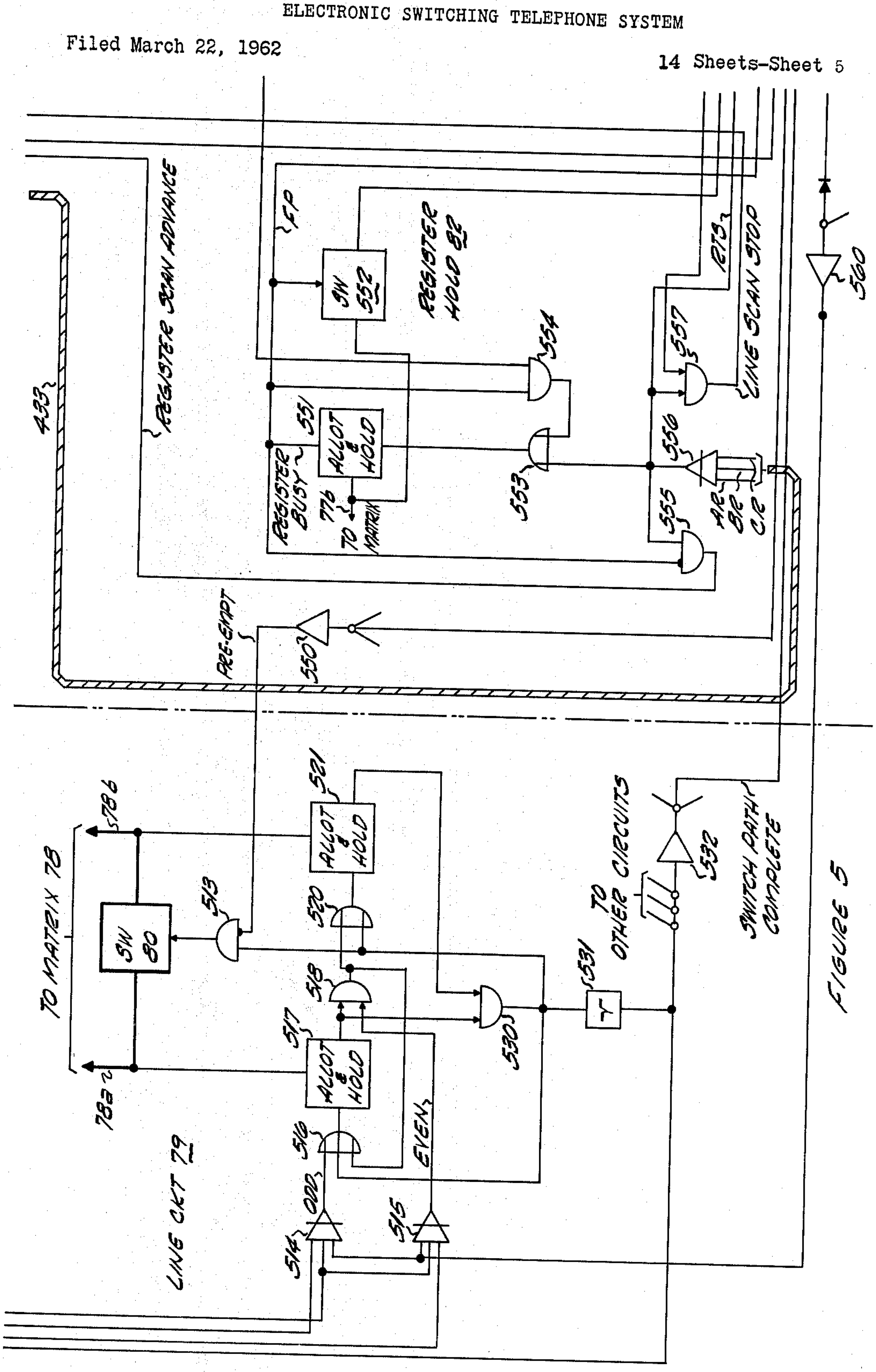
Figure 6:
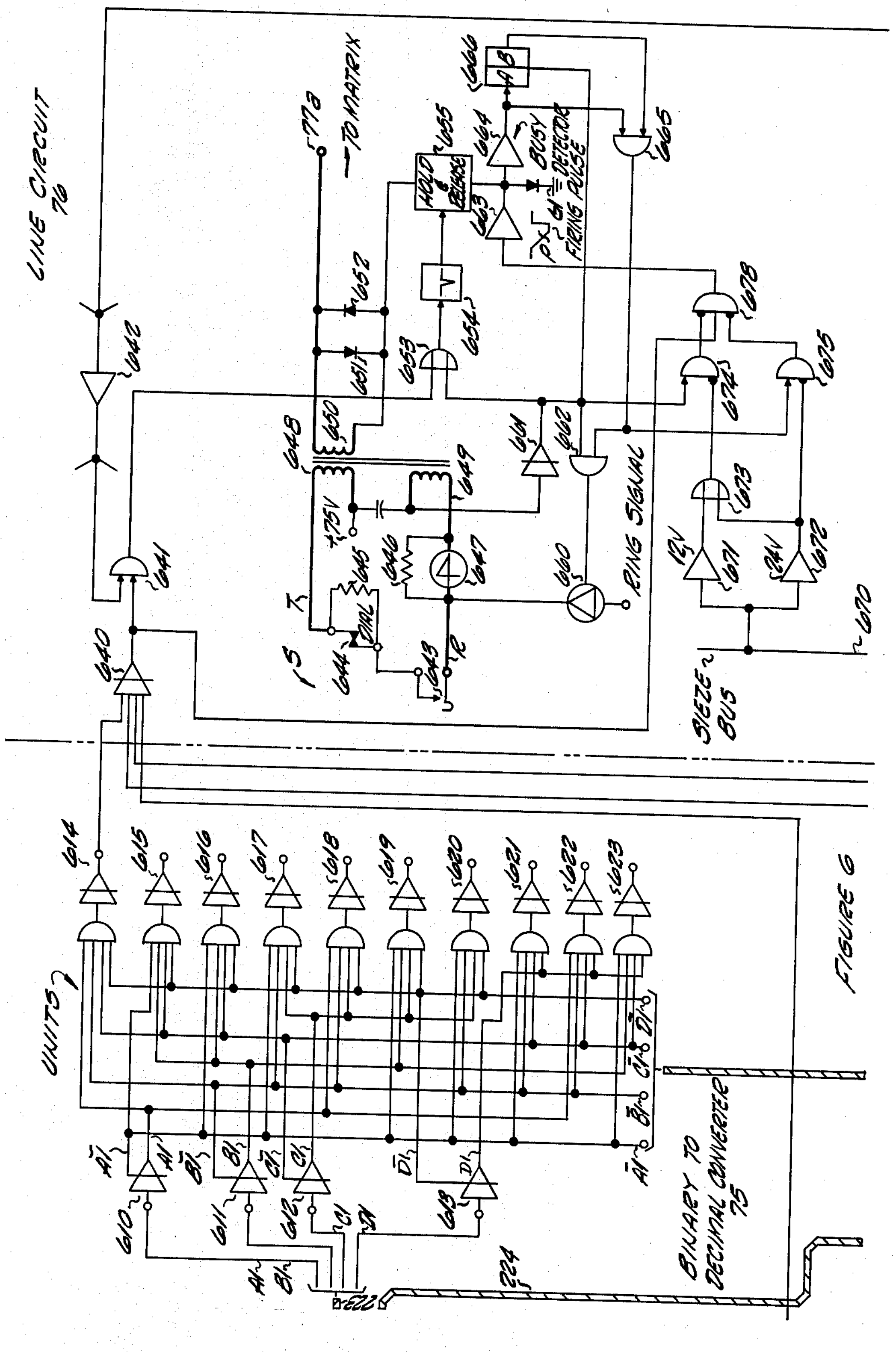

An exemplary subscribers line circuit 76, shown in FIG. 6, includes a talking circuit T and R and the subscribers point of access 77*a* to the matrix. The other side of the matrix appears in FIG. 5. There, a first point 77*b* gives access to a register and a pair of second points 78 gives access to a link 79 which completes the talking circuit via a circuit 80. The talking circuit is indicated throughout the drawings by heavily inked lines.

The remainder of FIGS. 3–10 show an exemplary register circuit. Its major components are a holding circuit 82, a sequence switch 83, a calling number store circuit 84, and a called number store circuit 85. When a path fires from a calling line through the matrix to the register hold circuit 82, the line scanner 71 transmits signals indicated by the calling line time slot through the binary to decimal converter 75 to store the calling number in decimal form in the circuit 84. Under the control of the sequence switch 83, dial tone is returned to the calling subscriber who proceeds to dial the called subscriber number. Dial pulses are transmitted through the matrix and the register hold circuit 82 to the called number store circuit 85. Thereafter, the sequence switch pulses both the calling number store and the called number store circuits 84, 85 to fire a path from calling and called lines through the matrix to the link circuit 79. Then, the link circuit releases the register.

SCANNER

The principal components of the scanner (FIGS. 3 and 4) are the free running pulse source 70 and the three chains of cascaded flip-flop circuits 71, 72 and 73. The pulse source 70 may take any suitable form. However, those skilled in the art are expected to tailor the source output to fit system needs. For example, the output of one exemplary pulse source is explained by the wave form I of FIG. 3. As there shown, each time slot consists of opposite polarity pulses (no significance attaches the particular polarities or time values shown in wave form I except that this wave form was actually used in one exemplary system). The positive going pulse edge (*i*) which marks the start of a time slot drives the link scanner 72. After a time period adequate to drive the link scanner (35 microseconds), the negative going pulse edge (*ii*) triggers a monostable multivibrator. For a 35 microseconds period (indicated by cross hatching), multivibrator 350 de-energizes the output conductor from its shaded side. A path fires through the matrix during this period. Then multivibrator 350 returns to normal at (*iii*) and energizes its shaded side output conductor, thus terminating the pulse firing pulse. During the next and last 60 microseconds in each time slot, all is quiescent. This allows the matrix to return to its quiescent condition (e.g., all capacitor charges reaches a normal condition, all semi-conductor charge carriers reach a quiescent condition, etc.). Since the upper source 70 output is energized for 35 microseconds, it is designated T35 in the drawing. Similarly, the terminal designated T95 is energized for 95 microseconds.

Each flip-flop circuit in the chains 71, 72, 73 normally feeds an output from the side shown by crosshatch shading, and the output switches to the unshaded side when an input signal is received. Consider chain 71, by way of example. When an input pulse is received at the lower or "set" terminal of a first stage 351 (FIG. 3), the circuit in that stage switches its output from the shaded to the unshaded side. The next input pulse at the "set" terminal returns the circuit 351 to its shaded side and switches the next cascaded stage 352 to its unshaded side. In the same manner, each successive pulse, of the polarity generated by source 70 as it energized terminal T35, steps the cascaded series of flip-flop circuits 71 to provide a binary coded output signal identifying the time slots defined by the source pulses.

Those familiar with binary coding devices of this type will readily recognize the following mathematical symbology which explains the flip-flop operation.

*Truth Table I*

| Time frame | $\overline{A1}$ | A1 | $\overline{B1}$ | B1 | $\overline{C1}$ | C1 | $\overline{D1}$ | D1 | Etc. |
|---|---|---|---|---|---|---|---|---|---|
| 0 | 1 | 0 | 1 | 0 | 1 | 0 | 1 | 0 | ------ |
| 1 | 0 | 1 | 1 | 0 | 1 | 0 | 1 | 0 | ------ |
| 2 | 1 | 0 | 0 | 1 | 1 | 0 | 1 | 0 | ------ |
| 3 | 0 | 1 | 0 | 1 | 1 | 0 | 1 | 0 | ------ |
| 4 | 1 | 0 | 1 | 0 | 0 | 1 | 1 | 0 | ------ |
| 5 | 0 | 1 | 1 | 0 | 0 | 1 | 1 | 0 | ------ |
| 6 | 1 | 0 | 0 | 1 | 0 | 1 | 1 | 0 | ------ |
| 7 | 0 | 1 | 0 | 1 | 0 | 1 | 1 | 0 | ------ |
| 8 | 1 | 0 | 1 | 0 | 1 | 0 | 0 | 1 | ------ |
| 9 | 0 | 1 | 1 | 0 | 1 | 0 | 0 | 1 | ------ |
| 10 | 1 | 0 | 0 | 1 | 1 | 0 | 0 | 1 | ------ |
| 11 | 0 | 1 | 0 | 1 | 1 | 0 | 0 | 1 | ------ |
| 12 | 1 | 0 | 1 | 0 | 0 | 1 | 0 | 1 | ------ |
| 13 | 0 | 1 | 1 | 0 | 0 | 1 | 0 | 1 | ------ |
| 14 | 1 | 0 | 0 | 1 | 0 | 1 | 0 | 1 | ------ |
| 15 | 0 | 1 | 0 | 1 | 0 | 1 | 0 | 1 | ------ |
| Etc. | ------ | ------ | ------ | ------ | ------ | ------ | ------ | ------ | ------ |

With the ten flip-flop stage line scanner 71 the ultimate count is 1,024 which means that the office shown may serve up to 1,023 telephone line circuits, allowing one count (the zero step) as a start signal. That is, each step of the binary counter has a duration equal to one pulse period from source 70. One pulse period identifies one subscriber line; the next pulse period identifies another line, etc. The line scanner counts the pulses and, therefore, identifies the lines. To increase the count, and thus the number of lines served by this office, it is only necessary to add stages to the binary counter. To decrease the count and thus the number of lines served by this office, it is only necessary to feed back signals from one stage to reset another stage before it normally would reset.

In FIG. 3, the circuits numbered 310–321 provide such feedback reset signals. However, it is thought that the operation of all of these circuits will be apparent from a description of the circuits 311, 315, 321. That is, the voltage at the input of inverter circuit 311 [point (*iv*)] is controlled by the output voltage from NOR circuit 315 and inverter 321. Normally NOR circuit 315 is "off" and ground appears at point (*v*). During each T95 time period, inverter 321 is "off" and point (*vi*) is also at ground potential. The diodes 314, 314*a* are poled to apply these ground potentials to point (*iv*) at the input of inverter 311.

During the eleventh time slot, the potential is removed from all of the conductors $\overline{A1}$, $\overline{B1}$, C1 and $\overline{D1}$. The NOR circuit 315 turns "on" and attempts to apply a negative potential to point (*v*). However, during the T95 portion of the eleventh time slot, the inverter 321 ground remains at point (*vi*) and effectively prevents any change of potential at point (*v*). But, when the T95 portion of the time slot disappears, inverter 321 switches "on," point (*vi*) goes negative and back biases diode 314*a*. This allows point (*v*) to go to the negative output of NOR circuit 315. Diode 314 is now back biased and capacitor 312 charges from the negative battery connected to resistor 313. As the charge accumulates on capacitor 312, the current through resistor 313 goes down and the voltage at point (*iv*) goes more negative. When the capacitor charges sufficiently, the inverter 311 turns "off." This resets the flip-flop 353 and advances the units count to its last position. Thus, the count cycle of the four units flip-flops 351–354 shrinks from sixteen to twelve (i.e., a decimal ten count with two reset control pulses).

Figure 13:
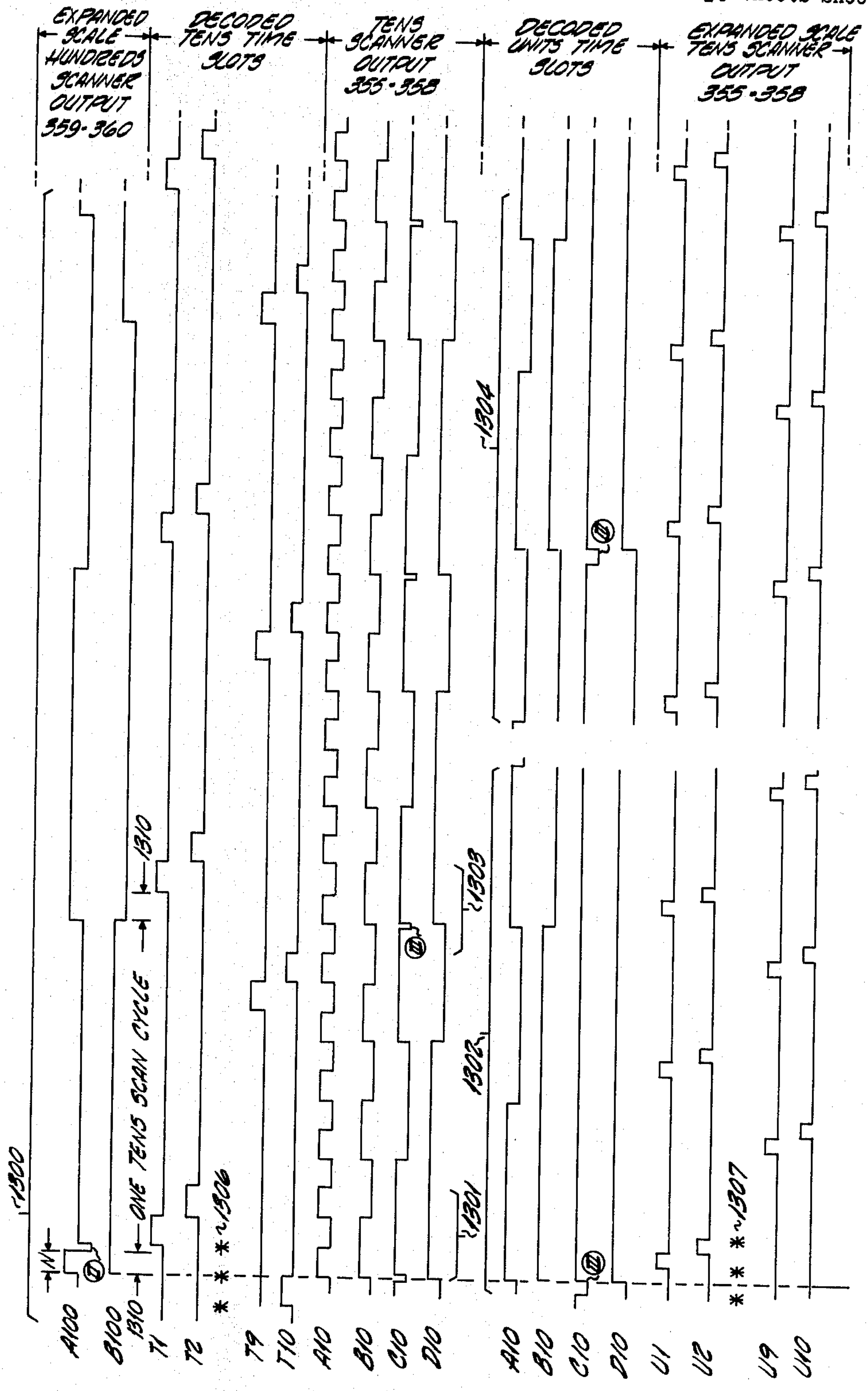
Figures 14, 15:
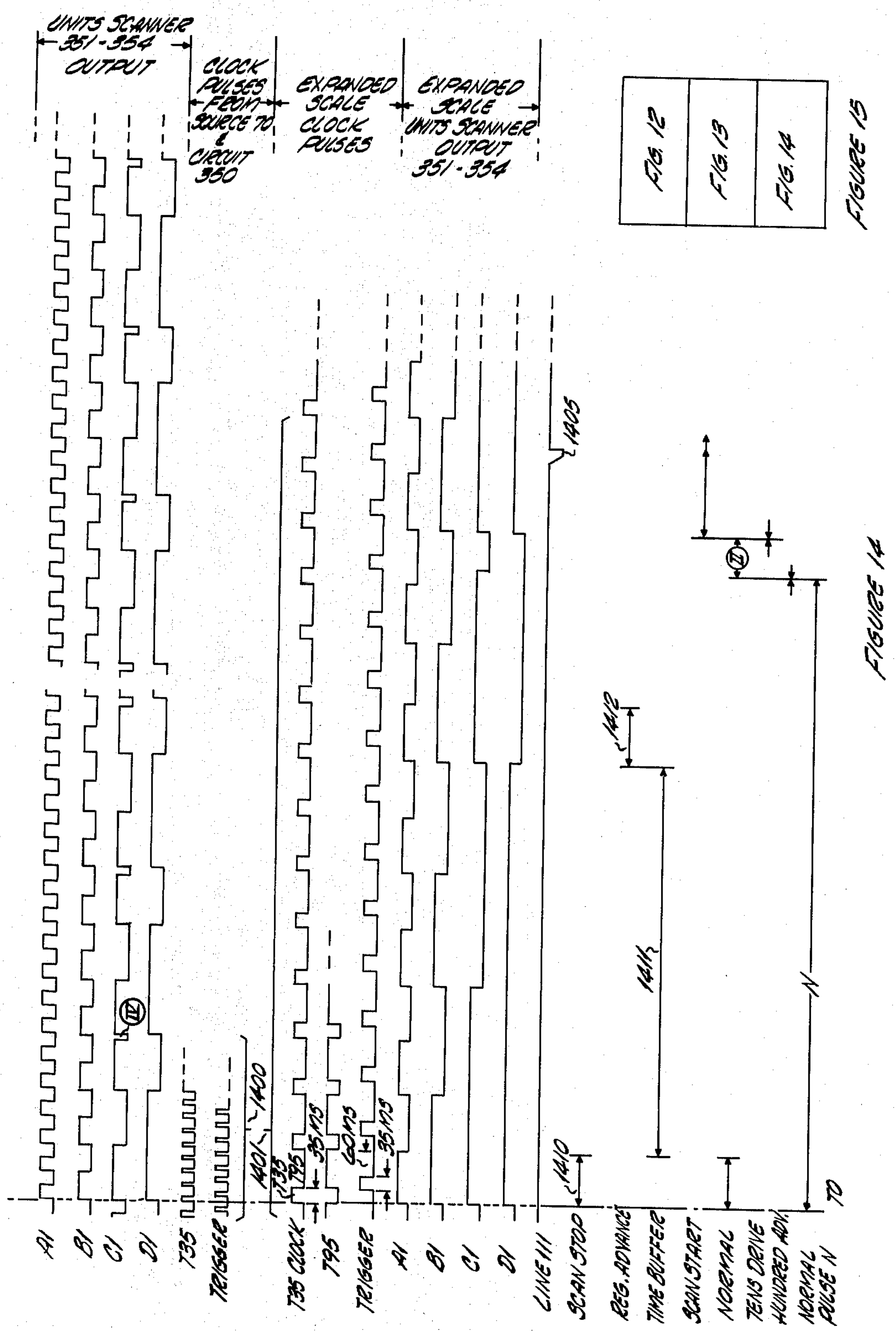
FIG. 15 shows how FIGS. 12–14 should be arranged.

The remaining gate circuits 310–321 function in a similar manner. While no effort is here made to explain all of these gate circuits in great detail, their function should become apparent from a study of the timing chart of FIGS. 12–14, when joined as shown in FIG. 15. This chart may be read either from the bottom up or from the top down. For this description, it will be read from the top down. Also, the chart shows the outputs for the specific circuitry of FIGS. 3 and 4. However, it should be understood that the principles may be applied to other circuitry also.

Figure 12:
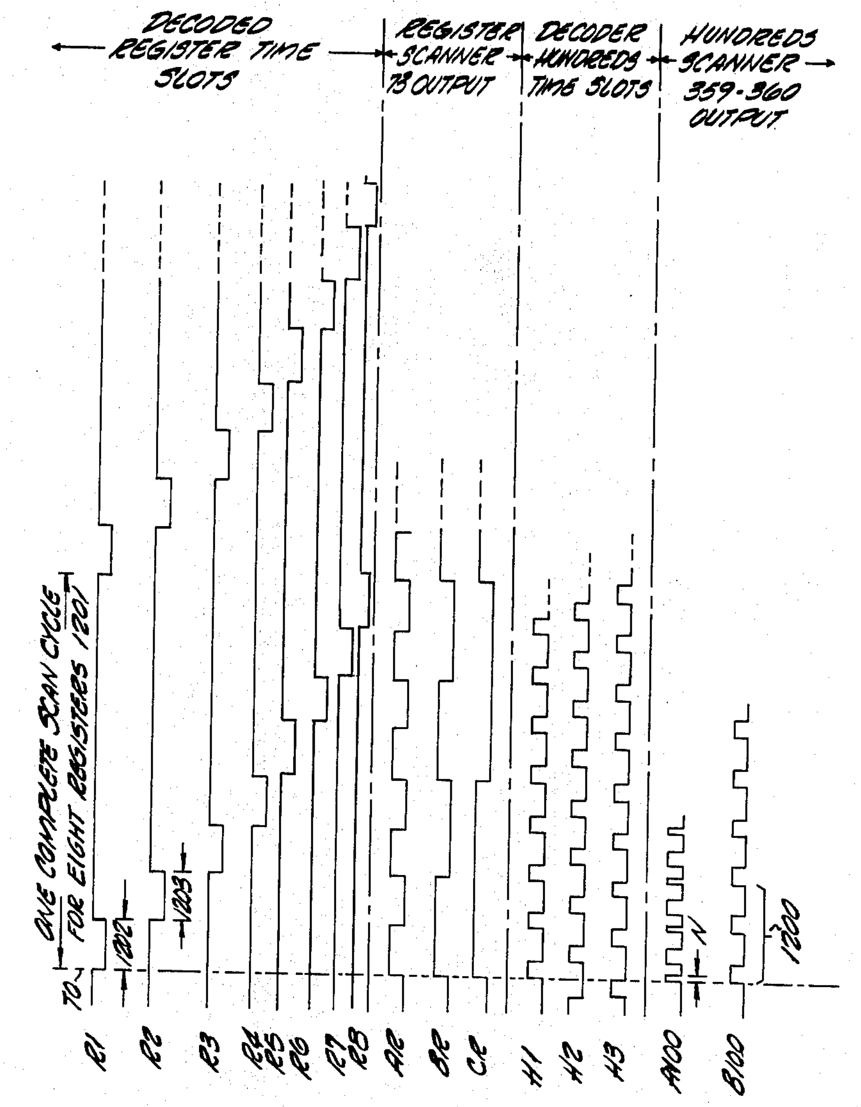
FIGS. 12–14 show a timing chart for explaining circuit operations.

In general, the timing chart includes four time scales. That is, the smallest scale is shown in FIG. 12. That segment identified by the bracket 1200 is expanded in FIG. 13 to occupy the space identified by the bracket 1300. Similarly, the bracket 1301 period is expanded to the scale of the bracket 1302, and the bracket 1303 is expanded to the scale of the bracket 1304. Likewise, in FIG. 14, the bracket period 1400 is expanded to the scale of bracket 1401. Thus, it is apparent that the smallest divisible time period appears at the bottom of FIG. 14 and the largest time period appears at the top of FIG. 12. To orient the reader, all scales preserve the same starting time base line T0 and a group of curves is repeated after each expansion. For example, the hundreds scanner output A100, B100 is shown at one scale at the bottom of FIG. 12 and at expanded scale at the top of FIG. 13.

Starting at the top of FIG. 12, a complete scan cycle is shown as beginning at time T0 and continuing for the time required to scan eight registers. One register identifying time slot appears at 1202, the next at 1203. In all, there are eight register time slots which recur endlessly as indicated by the curves R1–R8.

These register time slots are defined by the decoded outputs of a binary counter 430–432. The binary outputs designated AR, BR, CR, are the voltages appearing on similarly designated conductors of flip-flops 430–432 in FIG. 4. Thus, each time that the flip-flop 430 receives a pulse at terminal (*vii*), the voltage on terminal AR changes polarity. Each time this voltage goes positive, flip-flop 431 operates and the voltage on conductor BR changes polarity. In like manner, the voltage on conductor CR changes polarity each time that the BR output goes positive. Hence, it is obvious that each of the flip-flops 430–432 runs at half the speed of the preceding flip-flop and that the same unique output condition occurs only once during any scan cycle. Thus, the pulse 1202, for example, is defined by a positive (or ground) potential on each of the three conductors AR, BR, CR.

The hundreds flip-flops 359, 360 function in a similar manner. The decoded hundreds time slot pulses are shown at H1, H2, H3. These decoded pulses are developed from the flip-flop output on the conductors A100, B100. An immediately apparent difference between the voltages on conductors AR, BR and CR and the voltages on conductors A100, B100 is that the output A100 is not symmetrical. This is because inverters 318, 321 cooperate to feed back resetting signals. Thus, an appearance of the pulse N indicates a normal condition which occurs at the start of each scan cycle. As shown in the expanded scale of FIG. 13, this normal pulse N terminates a brief period of time (indicated by II in a circle) before the start of a tens count. As will become more apparent, this is a buffer zone to guard against faulty response to two or more signals.

One "tens" scan cycle is completed during each hundreds time slot. FIG. 13 shows the cyclic repetition of pulses indicating the digits, ten, twenty, ninety and one-hundred. The stars 1306 indicate omission, to conserve drawing space, of the pulses indicating the digits thirty through eighty. They are, of course, present in the actual circuit output.

The output of the tens flip-flop chain 355–358 is shown by the curves A10–D10. Again, the circuit operation is the same as that described for curves AR, BR, CR, except for the discontinuity (shown at III in a circle). This is a short, reset pulse caused by the interaction of circuits 317, 321. It drives the hundreds scanner as indicated by the pulse positions in curves A100 and D10. This reset pulse also appears at III in the expanded scale showing of curves A10–D10.

The units scan cycle and scanner output are shown by curves U1, U2, U9, U10 and A1–D1. Again, the stars 1307 indicate that the time slots identfiying the digits three through eight are omitted. Also, the reset pulse (shown at IV in a circle) results from the interaction of circuits 315, 321 and drives the tens chains of flip-flops. This is the reset pulse, the generation of which was explained above.

Finally, the source output voltage that appears at point T35 is shown by curve "T35 clock." Its inverse (the voltage at point T95) is shown by curve T95. As will be apparent by inspection of the drawings, the positive going edge of the T35 pulse drives both the units chain of flip-flops 351–354, and the monostable multivibrator 350. The output of a monostable multivibrator 350, used to trigger firing pulses, is shown in a curve marked "trigger."

A buffer time zone is provided at the start of each scan cycle. It may be recalled that a scan cycle is the period 1201 required for eight register scan pulses. It begins at time T0. During the first scan of units numbers, while normal pulse N appears on conductor A100, there is no tens scan pulse as shown at 1310. This normal pulse of buffer time period is also indicated by the line N at the bottom of FIG. 14. At the very start of the normal pulse period N, the input to circuits 301–303 are marked so that the line scan can be stopped (1410), if a call is ready to complete. At this time, all circuits are in a normal condition. After termination of the period when a scan cycle can be stopped, there is an extended time buffer period (1411) during which nothing can happen responsive to the scanner circuit. Next, the input conductors to circuit 310 are marked (1412) so that the register scan cycle can be advanced. During this time period a timer 322 energizes the register scanner 73 and applies a reset voltage to the line scanner 71. This insures that the line scan will start from a normal condition. After this, the circuits 318–320 cooperate to drive the hundreds register and thus, terminate the normal pulse N. Thereafter, the buffer time period (II in a circle), occurs before the output D1 drives the tens scanner 355–358 at which time the scan cycle starts. The first possible firing pulse after time T0 is shown at 1405.

As will become more apparent, the link scanner functions similar to the line scanner function. That is, each flip-flop is a cascaded chain 420–426 drives the next flip-flop. The output of the chain may then be decoded to provide time slot pulses.

Two inverters 330, 400 effectively select either of the scanners. That is, the inverters turn "on" and "off" together. When they are "on" diodes 361–370 are back biased and can have no effect. All link scanner outputs are made negative through diodes 410–416; therefore, the link scanner is inhibited. Conversely, when the inverters are "off," the diodes 410–416 are back biased and the line scanner is inhibited via diodes 361–370.

Figure 4:
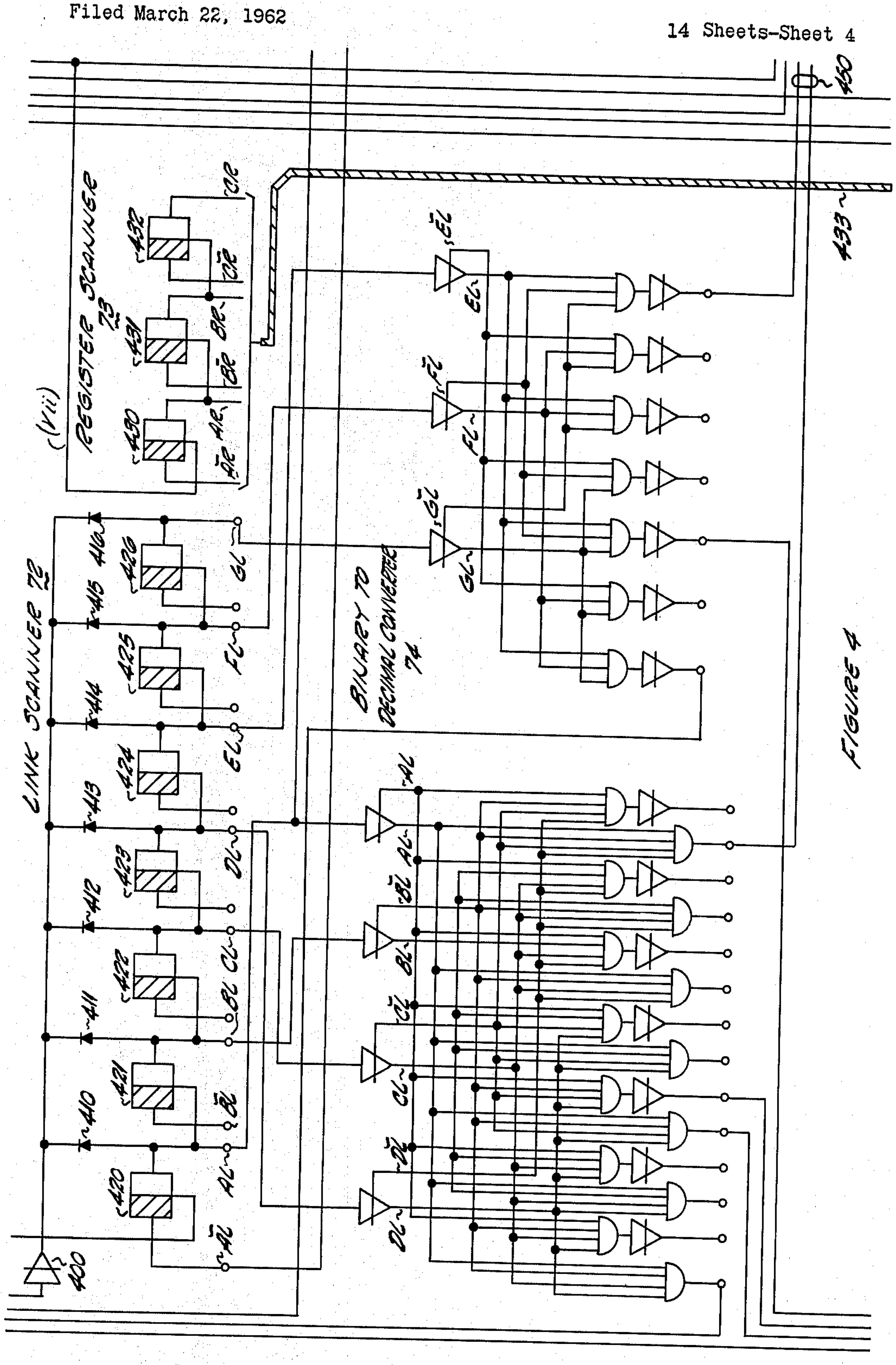
Figure 7:
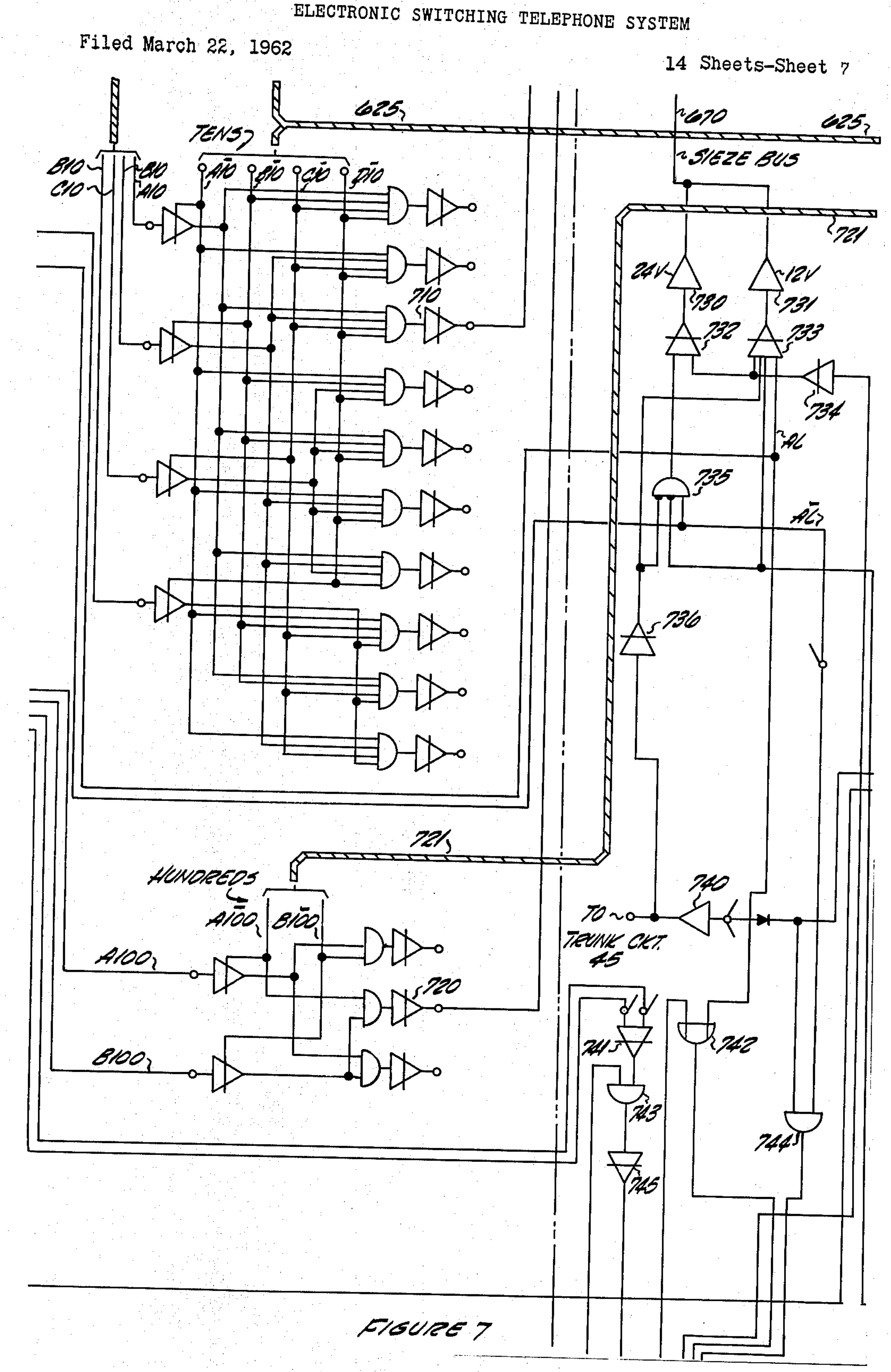
Figure 8:
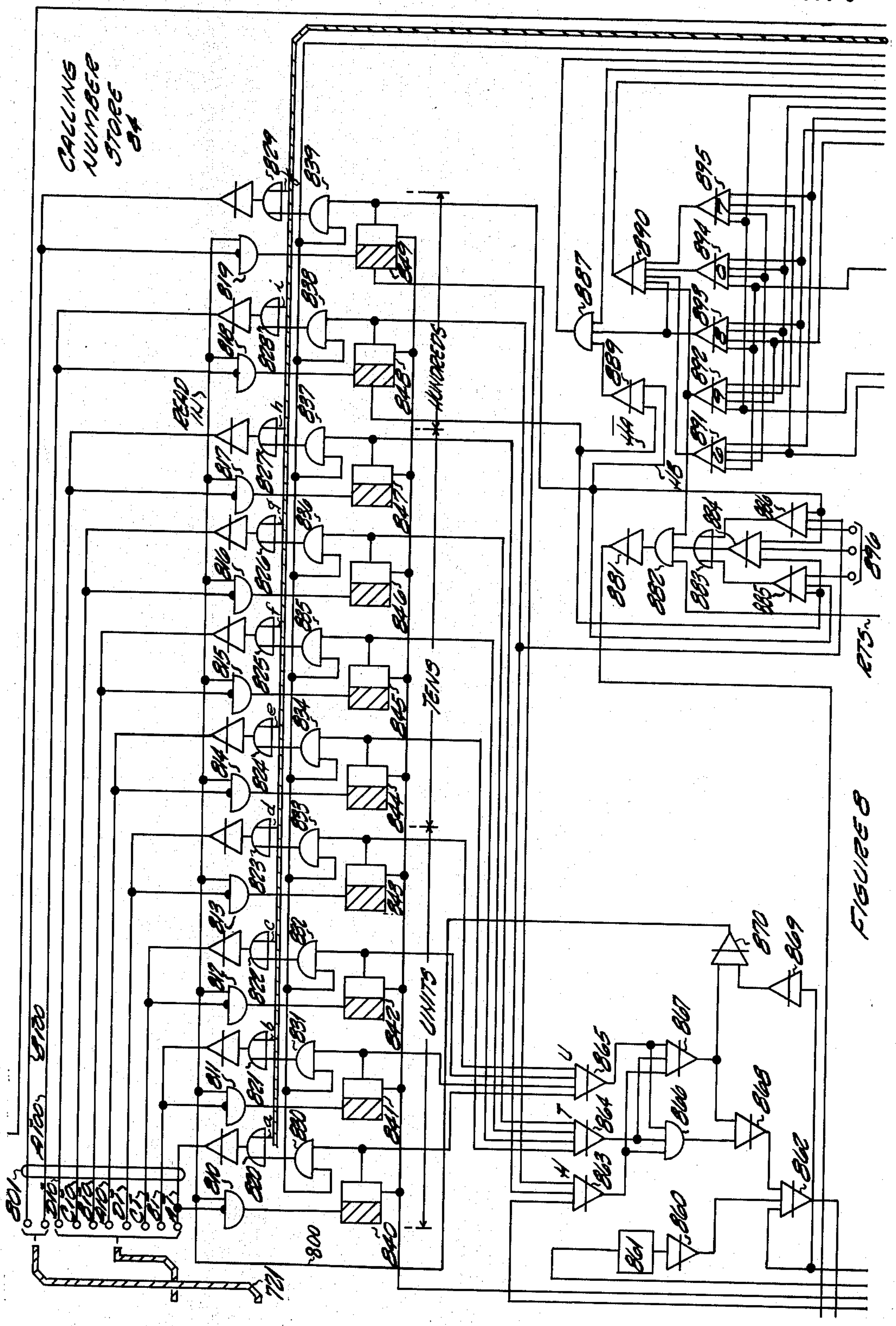
Figure 9:
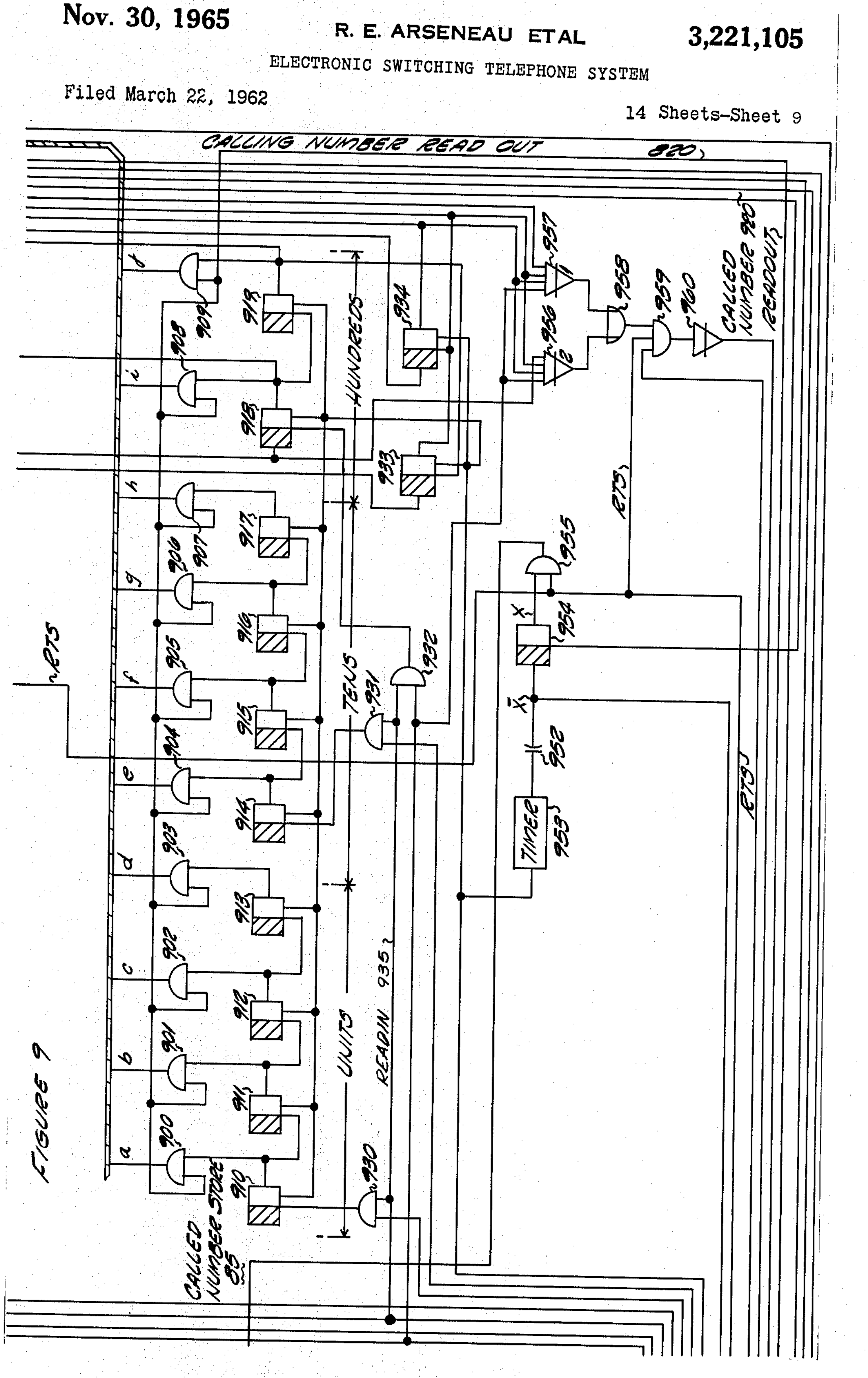

Two binary to decimal converters 74, 75 are included in FIGS. 4 and 7 to convert the binary code signals from the scanners into a decimal code for identifying subscriber line numbers and specific links. For example, by comparing Truth Table I and the input conductors to AND gate 614, it will be found that a signal, described as units digit "1," is given when the line scanner stands on time frame position "one." By making similar comparison in the converter 75, we learn that the AND 710 (for example) indicates the thirties time slot, and the AND gate 720 (for example) indicates the two hundreds time slot. Thus, it is apparent that the upper three terminals of NOR gate 640 are wired to indicate the time slot having the numerical designation one-thirty-two or time slot "231." The lowermost input to NOR circuit 640 is de-energized when the monostable multivibrator 350 de-energizes its shaded side. This allows time to apply a slow rising pulse to the link side of the matrix, before generation of a firing pulse.

A CALL THROUGH THE SYSTEM

At the start of each T95 portion of the two-hundred-thirty-first time slots during each line scan, the upper three inputs of NOR gate 640 are de-energized. For the next 35 microseconds, the lower input of NOR gate 640 is de-energized by monostable multivibrator 350. NOR gate 640 conducts during this period. Circuit response to a conductive NOR circuit 640 depends upon the associated subscriber line condition. If it is assumed that the line is on-hook, there is no response in the line circuit 76.

*Seizure.*—When a subscriber removes a hand set or receiver from a hookswitch 643, a circuit is completed from a +75 volt battery through winding 648, upper or tip conductor T, dial springs 644, hookswitch contact 643, lower or ring conductor R, PNPN diode 647 and winding 649 to inverter 661. The PNPN diode fires. The +75 volt input to inverter 661 removes the signal applied through gate 674 to the inhibit terminal of gate 678.

The next time frame while NOR gate 640 conducts, a signal appears at the input terminal of inhibit gate 678, thus energizing amplifier 663. The amplifier 663 characteristics provide an output pulse having a slow rising, negative going ramp front voltage as shown by pulse P. Again, the reason for the slow rising ramp front is fully explained in the above identified Bereznak application. The slow rising pulse is applied from amplifier 663 through a circuit 655 and diode 651 to terminal 77*a* of the switching matrix. (The diode 651 later passes a positive hold current from the matrix through circuit 655 to ground G1.) This pulse P may fire a path from the line circuit 76 through the matrix to point 77*b* (FIG. 5).

An assumption may be either that the path successfully completes its way through the crosspoint matrix to a register or that the path fails to reach a register. The reasons why it fails are not important; perhaps there was internal blocking in the matrix. In any event, when monostable multivibrator 350 times out, NOR circuit 640 switches "off" because its lowermost input is energized. This turns "off" amplifier 663, terminates pulse P, and terminates the attempt to fire through the matrix. During the next line scan, NOR gate 640 switches "on" again and a firing pulse P is again applied to the matrix. Eventually, a path reaches a register.

When a calling line goes off-hook, the output of inverter 661 is also removed from the upper input of AND gate 662 to prevent the transmission of a ringing signal to a calling line.

*Lockout.*—Upon completion of a path through the matrix, an amplifier 664 conducts and switches flip-flip 666 to its "B" side. This "B" side output is applied through an AND gate 665, inhibit gate 675 to inhibit gate 678. Thus, gate 678 is inhibited to prevent further matrix pulsing, and the calling line circuit is placed in lockout after flip-flip 666 switches to its "B" side.

*Register.*—The register scanner 73 (FIG. 4) stands in a particular condition when the path fires through the matrix. For the purposes of this description, it is assumed that the register scanner has removed all output voltage from the conductors AR, BR and CR. This is during the pulse 1202 in FIG. 12. With this assumption, a NOR circuit 556 conducts to enable a particular register. Thus, a signal feeds through OR gate 553 and a switch circuit 551 to energize the register access point 77*b* in the matrix if the register is idle. If busy, circuit 551 does not respond to the output of NOR circuit 556. The potential at point 77*b* is the potential difference (with respect to the potential at point 77*a*) which fires a path from the line circuit (FIG. 6) through the matrix to the register hold circuit 82 (FIG. 5). The output from the NOR circuit 556 also feeds to an AND gate 557 without effect because a calling condition (as distinguished from a called condition) exists at this time. A voltage is applied from NOR circuit 556 through inhibit gate 555 to hold NOR gate 310 "off," and prevent advance of the register scanner 73. Also, the output of NOR gate 556 is applied to the register time slot lead RTS with the effects described below. As will become more apparent, most of the register logic can only function during the time slot while conductor RTS is energized.

Immediately upon the completion of a path through the matrix, the allot and hold circuit 551 energizes the REGISTER BUSY terminal. This inhibits gate 555 to allow NOR gate 310 to conduct and allow the register scanner 73 to advance and assign the next register during future register time slots. That is, NOR gate 310 conducts during the time period 1412 (FIG. 14) and triggers timer 322 which measures a time period during which the register scanner advances and the line scanner resets. The busy output from the circuit 551 also feeds through AND gate 554 and OR gate 553 to hold the circuit 551 after the register identifying time frame terminates and the NOR gate 556 ceases to conduct. This, in turn, holds the path through the matrix to point 77*a*. Finally, the output of circuit 551 operates a switch-through circuit 552 and energizes a fired pulse conductor FP. The switch through circuit 552 connects the matrix access point 77*b* to a dial pulse controlled circuit.

The call must be completed within a predetermined time period. That is, the potential on fired pulse conductor FR causes a shaped output pulse to appear at the right side of circuit 1002. As we shall learn, the primary function of pulse shaper 1002 is to reconstitute dial pulses. In any event, when the path completes through the matrix, a pulse produced by pulse shaper 1002 triggers a timer 861. For the next period of time, timer 861 holds inverter 860 "off." During this time, NOR gate 862 energizes the righthand input of AND circuit 554. All of this happens before termination of the register identifying scan pulse and while OR gate 553 is energized from NOR gate 556. Thus, before NOR gate 556 ceases to conduct, the REGISTER BUSY signal from circuit 551 is fed through AND gate 554 and OR gate 553 to hold the circuit 551 "on." If the calling subscriber does not transmit dial pulses before timer 861 times-out, its output signal is removed from the inverter 860 to energize middle input of NOR gate 862. The resulting termination of output from gate 862 prevents coincidence at AND gate 554, thus removing the holding potential to circuit 551. This, in turn, opens the circuit to the matrix at point 77*b*. The result is a release of the path through the matrix to the calling subscriber line. Here, however, it is assumed that the calling subscriber does in fact dial before timer 861 times out.

Means are provided for storing the calling number responsive to the completion of a path from a calling line circuit through the matrix to a register. It may be well to recall that the calling line is identified by the time slot when NOR gate 640 conducts. Therefore, it is only necessary to pulse the calling number store circuit 84 to record the output condition of the line scanner 71 when a path fires through the matrix. In greater detail, another effect of the shaped pulse from circuit 1002 output is that the inverter 869 switches "off" for a single dial pulse period. When the gate 869 ceases to conduct, a potential is removed from the input of NOR gate 870 which switches "on." A "READ-IN" wire 800 is then energized, causing the calling number to be stored in a chain of flip-flops which constitutes the calling number store 84. For example, if the calling line is fired, through the matrix during a time slot which is identified by a potential on conductor $\overline{A1}$, a signal on the inhibit terminal of inhibit gate 810 prevents the voltage on wire 800 from switching flip-flop 840 to its shaded side. In a similar manner, if any other of the conductors 801 are energized from the scanner, a corresponding signal inhibits the switching of a flip-flop circuit. All other inhibit gates, not inhibited from the scanner, conduct and the voltage on wire 800 sets the corresponding flip-flops. Thus, if the first two conductors $\overline{A1}$ and $\overline{B1}$ are not energized, for example, the flip-flops 840, 841 switch to their shaded side to store the digit "2."

After hundreds, tens, and units digits of the calling number are stored, the flip-flops of chain 84 energize one or more inputs to the hundred, tens and units NOR gates 863, 864, 865. Then, all of these NOR gates switch "off," NOR gate 867 switches "on," and NOR gate 870 switches "off." When NOR gate 870 switches "off," no further signals are transferred from the line scanner 71 to the calling number store circuit 84.

Means are provided to check for the completeness of the storage of the calling number in the register 84. If all digits are stored, the call is allowed to proceed. If not, the register is released, and a new path must be fired through the matrix to another register. In greater detail, normally the NOR gates 863, 864, 865 are not energized from the unshaded sides of the flip-flop chain in the calling number store circuit 84. Thus, all of these NOR gates are normally "on" and AND gate 866 conducts. If a unit's digit is successfully stored, at least one terminal is energized at the input of the NOR gate 865 which switches "off." In similar manner, if a tens digit is stored, the NOR gate 864 switches "off," and if a hundreds digit is stored, the NOR gate 863 switches "off." The instant that these NOR gates 863, 864, 865 switch "off," the NOR gate 867 switches "on" and AND gate 866 switches "off." This means that NOR gate 868 remains "off" and the right hand input of NOR gate 862 is de-energized continuously. The result is that NOR gate 862 is held "on" to complete the holding "and" function at gate 554. On the other hand, if all three digits are not stored in the calling number store circuit 84, the NOR gate 867 does not switch "on" when AND gate 866 switches "off." NOR gate 868 switches "on" and applies a potential to the right hand input of NOR gate 862 which switches "off." The "and" function disappears from the input of AND gate 554 which switches "off." The path through the matrix releases. If the calling station remains off-hook, either a new path may fire or the line circuit may remain in lockout, as required. With the particular wiring that is shown in FIG. 6, the circuit goes into lockout. More particularly, the feedback from flip-flip 666 through gates 665, 675, 678 to amplifier 663 prevents a new firing until after the calling subscriber station hookswitch contacts 643 are again opened and closed.

Figure 10:
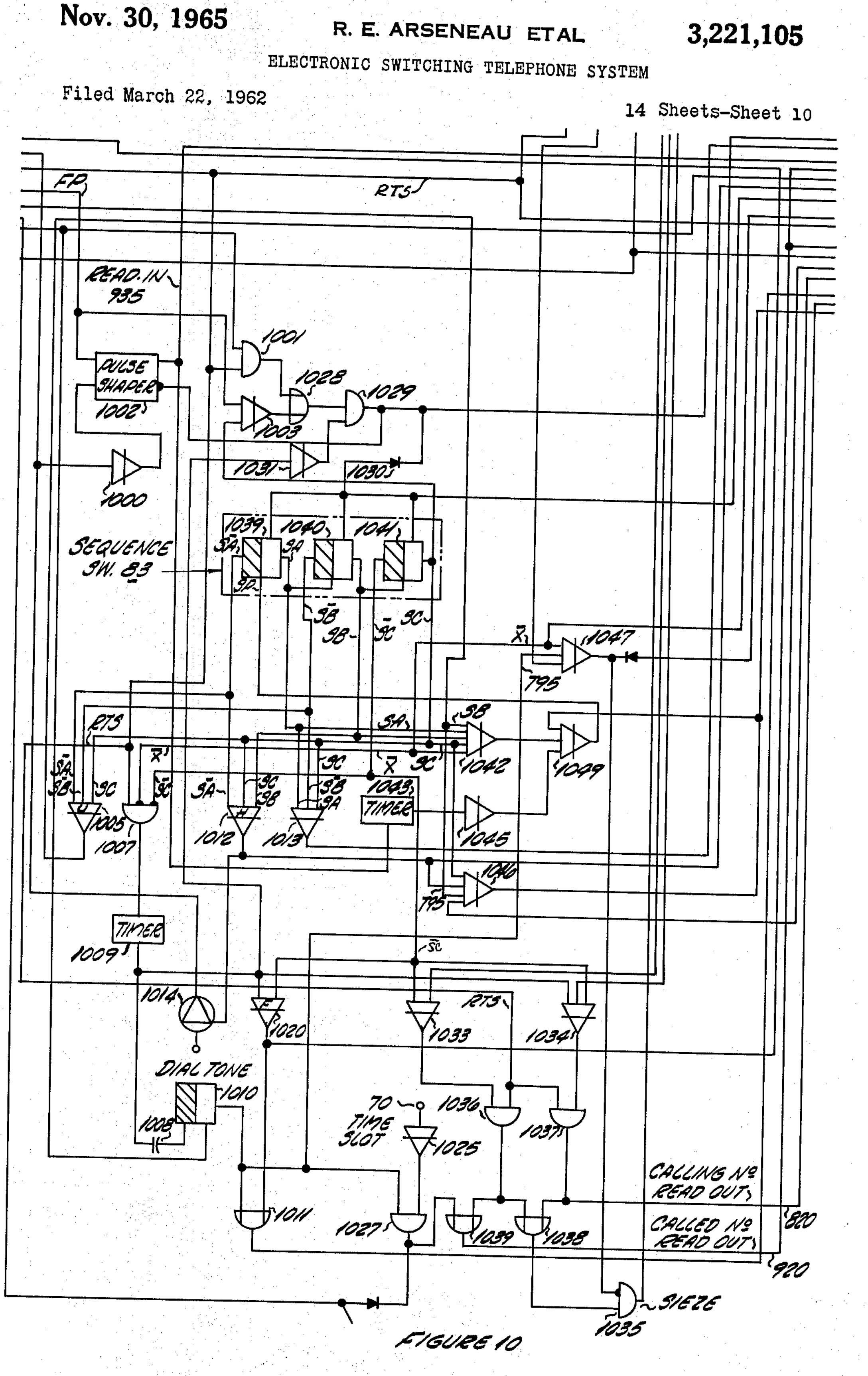

*Sequence switch*.—The sequence of events required to establish a call is controlled from the sequence switch of FIG. 10. The principal element of this switch is a flip-flop chain 1039–1041. This chain is arranged to take one step each time that a potential is removed from the terminal marked SP. This potential is, in turn, controlled from a NOR gate 1049. The upper input to the NOR gate 1049 is energized from a NOR gate 1046, which is effective only during special calls identified by certain level markings. The middle input of the NOR gate 1049 is energized only during executive right-of-way. Obviously, therefore, NOR gate 1049 is normally controlled from its lower input terminal. A timer 1043 switches "on" each time that the fired pulse lead FP is energized and then holds due to its timing characteristics for a measured period of time. When timer 1043 switches "on," the inverter 1045 switches "off." When it does, a voltage is removed from the lower input terminal or NOR gate 1049 which switches "on." When timer 1043 times out, inverter 1045 switches "on" and NOR gate 1049 switches "off." In doing so, the flip-flop chain 1039–1041 is driven one step. This advances the sequence of events in the register one step.

The output of the flip-flop chain 1039–1041 is given by the following "Truth Table II."

*Truth Table II*

| Step | Flip-flop output | | | | | | Function |
|---|---|---|---|---|---|---|---|
| | $\overline{SA}$ | SA | $\overline{SB}$ | SB | $\overline{SC}$ | SC | |
| 0 | 1 | 0 | 1 | 0 | 1 | 0 | Store calling number. |
| 1 | 0 | 1 | 1 | 0 | 1 | 0 | Send dial tone and store hundreds digit. |
| 2 | 1 | 0 | 0 | 1 | 1 | 0 | Cancel dial tone and store tens digit. |
| 3 | 0 | 1 | 0 | 1 | 1 | 0 | Store units digit. |
| 4 | 1 | 0 | 1 | 0 | 0 | 1 | Link scan and switch-through. |

The sequence switch 83 is driven one step after the calling number is stored. That is, the output from the timer 1043 starts when circuit 551 energizes the firing pulse lead FP, to trigger pulse shaper 1002. The timer immediately gives an output signal to inverter 1045 which switches "off" and NOR gate 1049 switches "on." After enough time to insure storage of the calling number, timer 1043 switches "off." Inverter 1045 switches "on" and NOR gate 1049 switches "off." When NOR gate 1049 switches "off," sequence switch 83 advances to give the output shown on step "1" of Truth Table II.

*Dial tone*.—From Truth Table II, we learn that on step "1," flip-flop circuit 1039 switches its "1" signal from its $\overline{SA}$ side to its SA side. This de-energizes the left hand input or NOR gate 1012 which conducts, energizes the lower input of AND gate 932 to prepare for storage of a hundred digit, and energizes the left hand input or NOR gates 956, 957 to preclude a prematuere level marking response. Also, the output from NOR gate 1012 energizes the control terminal of dial tone gate 1014. The dial tone gate switches "on," and dial tone is transmitted from a dial tone source through switch-through gate 552 (FIG. 5), matrix access point **77*b*, the path fired through the matrix to point 77*a* (FIG. 6), a secondary winding 650, and the transformer windings 648, 649** to the calling subscriber station.

*Dialing*.—Nothing further happens until the calling subscriber responds to dial tone by operating dial contacts 644 by any well known means such as a finger wheel (not shown). Connected across these contacts is a resistor 645 which prevents the loop including the line conductors TR from going "open" during dialing. Thus, the PNPN diode 647 will remain in its fired condition even when the dial contacts 644 open.

Each dial pulse does, however, produce a voltage change on the line T, R due to insertion of the IR drop across the resistor 645. This voltage change induces an output voltage pulse in the winding 650. Therefore, a voltage signal passes from point 77a through the matrix to point 77b, and the switch through circuit 552 to the inverter circuit 1000. The inverter circuit 1000 switches "on" and "off" at the start and end of each dial pulse. The circuit 1002 shapes these pulses. The first pulse of each pulse train turns "on" the timer 1043 which remains "on" during inter digit pulse time periods. A predetermined time period after the end of the last pulse in a pulse train, timer 1043 turns "off."

*Hundreds store.*—Each time that a dial pulse is received, pulse shaper 1002 applies a voltage signal to a "Read-In" bus 935 and re-energizes timer 861. There is a coincidence at the inputs of AND gate 932 where the lower input terminal is being marked from NOR gate 1012. Thus, the first digit dialed from the calling station is stored in a hundreds register 918, 919, 933, 934.

The sequence switch 83 is driven to step "2." More particularly, timer 1043 switches "on" and remains "on" during a pulse train due to its slow turn "off" characteristics. After the end of the pulse train, timer 1043 times out and switches "off." NOR gate 1049 switches "off" and pulses the terminal SP to give the output shown on step "2" of Truth Table II.

When the sequence switch reaches step "2," a potential appears on the left hand input of NOR gate 1012 which switches "off." However, a potential is also removed from the left hand input of NOR gate 1013 which switches "on." This removes the signal at the lower input of AND gate 932 to prevent further operation of the hundreds register. Instead, a signal appears at the left hand input of AND gate 931 to prepare the "tens" register. Also, dial tone terminates when the control terminal of dial tone gate 1014 is de-energized.

*Level marking.*—The register now stands ready to receive and store the tens digit. However, before explaining this feature, it may be well to explain the possible effects of the stored hundreds digit. As those skilled in the art know, the hundreds digit may serve not only as a part of a directory number, but also as level marking to identify a class of calls, e.g., the receipt of a "zero" as a first digit means a call to an operator, a "nine" means a call to central office, etc.

In greater detail, the digit stored in the hundreds registers is the digit "zero," the NOR gate 894 switches "on" to indicate that the call is for an operator. Other NOR gates 891–895 conduct responsive to the hundreds digits 6, 9, 8, 0, and 7. In any event, the NOR gate 890 switches "off" on marked levels when NOR gates 891–895 switch "on." The voltage at the lower input of NOR gate 1046 disappears when gate 890 turns "off." The upper two input terminals of gate 1046 are not energized when the sequence switch is on steps "2" or "3." Thus, the next to bottom input of NOR gate 1046 is controlling at this time. As the pulse source 70 energizes and deenergizes the point T95, NOR gate 1046 switches "off" and "on." The NOR gate 1049 follows and applies pulses to point SP to step the sequencing switch 83 to its step "4." This cancels storage of tens and units called number digits and advances circuit operations to complete the functions indicated by level marking.

*Tens and units store.*—Assume that the hundreds digit indicates that tens and units digits will follow (i.e., is not a digit 6, 9, 8, 0 or 7). The sequence switch steps on to step "2" when timer 1043 times out at the end of the hundreds digit. NOR gate 1013 conducts to energize the left hand input of AND gate 931. Thus, each time that a dial pulse is received, pulse shaper 1002 energizes "Read-In" conductor 935, and an input signal passes through AND gate 931 to the tens register flip-flop circuits 914–917. Again, timer 1043 detects the ends of the tens digit pulse train, pulses inverter 1045, and drives the sequence switch 83 to its step "3." On step "3," conductor SA is energized; therefor, NOR gate 1013 switches "off" to deenergize the left hand input of AND gate 931 and prevent further operation of the tens register.

On step "3" NOR gate 1005 conducts, thus energizing the left hand input of AND gate 930. In this condition, the next digit pulse train received from the calling subscriber station and shaped in circuit 1002 passes from "Read-In" conductor 935 through AND gate 930 to the units register 910–913. At the end of the units digit pulse train, timer 1043 drives the sequence switch 83 to step "4."

On step "4" conductor SC is energized to switch "off" NOR gate 1005 and deenergize the left hand input to the AND gate 930. The SC output potential also feeds to the upper input of NOR gate 1046 to stop the automatic stepping of the sequencing switch if level marking occurred as a result of the stored hundreds digit. Also, the SC output appears at the next to bottom input of NOR gate 1042 without effect at this time.

Both the calling and called numbers are not stored in the register and the sequence switch resets on its step "4."

*Completion of talking circuit.*—To understand the next operation in the chronological sequence of events occurring as a call is set up, it is necessary to study the link circuit of FIG. 5. To do this, it may be well to recall that the link scanner 72 is driven from the pulse source 70. The output from the link scanner 72 is fed through a binary to decimal converter 74 in the manner described above in connection with converter 75. Therefore, the links are identified by time slot pulses just as the line circuit of FIG. 6 is identified by the time slot when NOR gate 640 conducts. However, there is one difference. The output of the binary to decimal converter 74 is wired to two NOR gates 514, 515, in each link circuit. Thus, each link is identified by two adjacent time frames defined by two adjacent pulse periods in the output of source 70. Since each line is identified by a time frame equal in length to one such pulse period, a link time frame is twice as long as a line time frame. As we shall learn, efforts are made to fire a path from the calling line through the matrix to a link while the first or "odd" NOR gate 514 conducts and from the called line through the matrix to a link while the second or "even" NOR gate 515 conducts. ("Odd" means no output signal at point $\overline{AL}$ and "even" means no signal at point AL.) If these paths fail to complete, the next link is seized and it tries to fire a path.

*Firing to links.*—With this explanation of the equipment required to scan the links, it is thought that the principles will be understood best by describing how a connection is completed to the links under control of the digits stored at 84, 85.

In greater detail, when the sequence switch 83 reaches its step "4," and deenergizes the output conductor $\overline{SC}$, firing control NOR gate 1020 switches "on." When NOR gate 1020 switches "on," a signal is fed to hold NOR gate 862 "off," thus preventing the "and" function of gate 554 which switches "off" with a consequential release of the matrix connection to the register. A signal also feeds from firing gate 1020 to AND gate 959, and through OR circuit 1011 to AND gate 557.

Nothing further happens until the register scanner 73 reaches the time slot which identifies the register being described. At that time, NOR gate 556 conducts to energize many terminals via the register time slot conductor RTS. This starts the final firing to links process.

One such terminal is the left-hand input of AND gate 557 where there is coincidence with the output of NOR gate 1020. This, in turn, feeds a signal over the LINE SCAN STOP conductor to the inverter 304 which switches "off" to deenergize the second from the right input of the hundreds NOR gate 303. At the end of a complete line scan cycle, all inputs of NOR gates 301–303 are deenergized as shown during the period 1410 of FIG. 14. Therefore, each of these NOR gates conducts to energize the AND gate 300, which also conducts.

Before AND gate 300 "conducts," inverter 330 is "on." In this particular circuit, the inverter 330 output is a negative polarity voltage which back biases the diodes 361–370. Thus, these diode gates have no effect and the line scanner functions. At this same time, inverter 400 supplies a negative potential through diode gates 410–416 to hold all link scanner output terminals at a negative potential. Hence, the link scanner is inhibited.

After AND gate 300 "conducts," the output of inverter 330 goes positive. Thus, all line scanner outputs are held positive and the line scanner is inhibited. However, the output of inverter 400 goes positive and back biases the diodes 410–416. Hence, the diode gates have no effect on the link scanner function.

Thus, it is apparent that during firing, the line scan and register scan stop but that link scan becomes effective.

During an "odd" time slot which identifies the link shown in FIG. 5, the upper two inputs of NOR gate 514 are deenergized. Simultaneously, the register identifying NOR gate 556 energizes one input terminal to the AND gate 959, NOR gate 1020 energizes another input of AND gate 959 and certain stored hundreds digits energize the third input of the AND gate 959. For example, a registration of the hundreds digit "1" or "3" causes NOR gate 957 to switch "on" and the hundreds digit "2" or "3" causes the NOR gate 956 to switch "on." Either way OR gate 958 conducts and causes an output at AND gate 959. Inverter 960 switches "off." An amplifier 560, common to all links, switches "off." This deenergizes the lower input of NOR gate 514 which switches "on" when marked from the link scanner to energize link matrix access point **78*a* via OR gate 516 and switch circuit 517**.

Means are provided for reading out the calling number stored in circuit 84. More particularly, the output from the register identifying NOR gate 556 feeds over conductor RTS to a pair of AND gates 1036, 1037. The other input to AND gate 1037 is energized from NOR gate 1034 when sequence switch deenergizes conductor $\overline{SC}$ on step "4." It may be recalled that the time frame is "odd"; conductor $\overline{AL}$ is not energized, and therefore, the left hand input of NOR gate 732 is not energized via inhibit gate 735. Moreover, the right hand input of AND circuit 744 and the middle input to NOR gate 1034 are deenergized. Thus, AND gate 1037 conducts and applies a pulse to the "calling number read out" conductor 820 as well as through OR gate 1038 and inhibit gate 1035 to inverter 734. By following the conductor 820, it will be found that a potential is applied to the left hand input terminals of each in a series of AND gates 830–839. The right hand input terminals of these AND gates are selectively energized from the calling number flip-flop storage chain 84. Thus, if for example, the first two flip-flops 840, 841 have been switched to store the unit digit "2" there is a coincidence at gates 830, 831 which causes current flow through OR gates 820, 821 to switch associated inverters "off." This deenergizes conductors $\overline{A1}$, $\overline{B1}$ in the cable 625. One "units" AND gate, such as 614, conducts and the associated inverter removes an input signal to a NOR gate, such as 640 in a calling line circuit. The NOR gate at the specific line circuit serving the calling party switches "on" because the hundreds, tens, and units input conductors are deenergized. A potential is applied from NOR gate 640 to the gate 678 in the calling line circuit.

It may be well to recall that when the calling line originally went "off-hook" and fired a path through the matrix to the register, flip-flip circuit 666 applied an output signal from its side B through AND gate 665 to gate 675. The output of gate 675 inhibits gate 678 to hold amplifier 663 "off." Therefore, the calling line circuit is now in lockout.

To over-ride lockout, it is necessary to remove the inhibits from gate 678 so that an output from NOR gate 640 turn "on" amplifier 663 through inhibit gate 678 and a pulse having wave form P is applied to matrix point **77*a*. This was accomplished when AND gate 1037 conducted and OR gate 1038 energized the "seize" bus via inhibit circuit 1035. Inverter 734 switched "off" and deenergized an input to NOR circuit 732. This causes a first type seizure signal (the output of 24V amplifier 730) to pulse a "seize" bus 670 which is common to all line circuits. The 24V detector 672 responds to energize gates 673, 674 which remove the inhibits from gate 678. In the calling line circuit where the calling number signals read out of store circuit 84 coincides at NOR gate 640, a signal feeds through gate 678 and pulses amplifier 663** which switches "on" and sends a firing pulse P to the matrix.

This firing pulse appears at matrix access point **77*a* at the same time that NOR gate 514 is energizing the link matrix access point 78*a*. Thus, a path attempts to fire from the line circuit matrix access point 77*a* to the link circuit matrix access point 78*a*. If a path successfully fires through the matrix, the circuit 517 applies a "busy" potential to the upper input of AND gate 518**.

After a period of time normally adequate for this path to fire from the calling line through the matrix to the link, the link scanner 72 steps to its "even" position, the NOR gate 514 switches "off," and the NOR gate 515 switches "on" in the link circuit identified by scanner 72. An output signal feeds through the AND gate 518 if a path successfully fires through the matrix. On the other hand, if no path fires through the matrix, the upper input terminal of AND gate 518 is deenergized and nothing happens until the next "odd" frame when a path tries to fire from the calling line to another link.

Assuming that the path was completed, AND gate 518 conducts. A signal feeds back through the OR gate 516 to hold the circuit 517 and the fired path "on." This signal also feeds through the OR gate 520 to energize the switch circuit 521 and therefore, the matrix point of access **78*b***.

Means are provided for reading out the stored called number. More specifically, when the link scanner 72 takes the step that switches "on" NOR gate 515, the circuit changes from "odd" to "even." The AND gate 744 conducts and NOR gate 1034 switches "off." The calling line number read-out signals disappears from conductor 820 and the AND gates 830–839 are no longer energized. Instead, the link scanner removes a signal from conductor AL and from OR circuit 742 while applying a signal to conductor $\overline{AL}$. This causes NOR circuit 1033 to switch "on." The AND circuit 1036 conducts and pulses the "Called Number Read-out" conductor 920 via OR gate 1039.

When the called number read out conductor is pulsed, the left hand input terminal of each of the AND gates 900–909 is energized. If any flip-flop is standing with an output on its unshaded side, the right hand input to the associated AND gate is also energized. Thus, signals selectively fed through OR gates 820–829 to the conductors 801 and cable 625. The result is that a NOR gate, such as 640, conducts in the called line circuit.

Since the called line is "on hook," the inverter circuit 661 is "on" and gate 678 is inhibited. Stated another way, the called line circuit is not in lockout. To remove the inhibiting signal, AND gate 1036 connects through OR gate 1038 and inhibit gate 1035 to the seize bus. Inverter 734 switches "off" and removes a voltage from the left hand input terminal of NOR gate 733. The link scanner is "even," conductor $\overline{AL}$ is energized, inhibit gate 735 conducts, NOR gate 732 is "off," and amplifier 730 does not conduct. Conductor AL is deenergized to remove a voltage from the right-hand terminal of NOR gate 733. NOR gate 733 conducts and 12V amplifier 731 applies 12 volts to seize bus 670 which is common to all line circuits. The resulting output from the twelve volt detector 671 inhibits gate 674 to remove the inhibit from gate 678. Note, on the 12 volt seize pulse, gate 675 is not energized since it is not necessary to override a lockout condition. In the called line circuit, a NOR gate 640 output is applied through gate 678 to amplifier 663 which pulses matrix access point 77*a* in that called line circuit. A pulse is also applied to point 78*b* in the link identified by the time slot pulse which causes an output current from even NOR gate 515. Thus, a path tries to fire from point 77*a* in the called line circuit through the matrix to point 78*b* in the link circuit.

If both paths did not fire, an AND gate 530 does not conduct to indicate a success and the next link identified by scanner 72 tries to complete a path through the matrix. The process continues at each link until a path is completed or until a special busy link is reached and busy tone is returned to a calling subscriber. The switch circuit 517 does not respond in any link which is busy when scanned.

*Busy test.*—It should be noted that called lines are seized by a second type of seize pulse (the output of the 12V amplifier 731). This time the pulse on bus 670 inhibits gate 674 but not gate 675. Therefore, if the called line is busy, its line circuit is in lock out, and the "B" side output of flip-flip 666 feeds back through AND gate 665 and uninhibited gates 675, 678 to hold amplifier 663 "off." No path will fire through the matrix because amplifier 663 does not pulse point 77*a*. The link scanner scans every link without success. Finally, the link scanner reaches the "Busy Tone Link" 40 (FIG. 1). Then a path for conveying busy time fires to the calling line.

*Ringing.*—When a path successfully fires from a link through the matrix to both calling and called lines amplifier 664 switches "on" in the called line circuit. Flip-flip 666 switches to its "B" side—but the called subscriber station is on-hook. Thus, inverter 661 is "on." The output of flip-flip 666 (feeding through AND gate 665) and the output of inverter 661 coincide at AND gate 662. The control terminal of tone gate 660 is energized and a "Ring Signal" is applied through gate 660 to conductor R. When the called subscriber answers, inverter 661 switches "off," the AND gate 662 no longer conducts, the control terminal of gate 660 is deenergized, and the "Ring Signal" is removed from conductor R.

*Switch through.*—Assuming that the path is successfully fired, a signal feeds from the busy output side of circuit 521 to the AND circuit 530. There the busy signal coincides with a similar busy signal from the circuit 517. The output of AND gate 530 feeds through an inhibit gate 513 to operate a switch through device 80 for interconnecting calling and called talking circuits (the heavily inked lines in FIG. 5). A portion of the ringing signal applied through gate 660 in the called line circuit 76 feeds back through device 80 to give ring back tone to the calling subscriber.

The output of the AND gate 530 also feeds through the OR gates 516, 620 to hold the circuits 517, 521 "on." Finally, the output of AND gate 530 pulses the differentiating circuit 531 which, in turn, applies a spike pulse to the input of a common amplifier 532 as an indication that a talking or switch path has been completed through the matrix. The pulse from differentiating circuit 531 also causes the timer 306 to measure a period of time during which the right hand input terminal of the hundreds NOR gate 303 is energized. The NOR gate 303 and the AND gate 300 no longer conduct. Inverter 330 removes the positive inhibiting potential applied through the diodes 361–370 to the line scanner outputs and substitutes a negative back bias to the diodes. The line scanner output is no longer inhibited. Inverter 400 removes the positive bias to diodes 410–416 and substiutes an inhibiting negative back bias. The link scanner is now effectively "off."

Means are provided for releasing the register after a call is switched through circuit 80 (FIG. 5). That is, the output of the common amplifier 532 is fed to the upper input of an AND gate 1001. AND gate 1001 conducts and feeds a signal through an OR gate 1028 to the upper input terminal of an AND gate 1029. Thus, the AND gate 1029 applies a pulse to the reset lead of the called number store circuit 85, the calling number store circuit 84, and seueqnce switch 83. The result is that all of the flip-flop chains return to their normal condition as shown on step "0" of the various Truth Tables. Also, AND gate 1029 inhibits timer 1002. Now the register is normal, the call is in progress, and the scanners function in the originally described manner.

*Release.*—At the end of a call, the conversing subscribers return their handsets or receivers to the associated hookswitches. Thereupon, contacts 643 open and break the circuits to the PNPN diode 647. When the PNPN diode switches "off," the inverter 661 switches "on" and applies a reset pulse to the line lock out flip-flip 666 which returns to its "A" side. Also, the output of the inverter 661 feeds through the OR gate 653 to a differentiating circuit 654 which pulses the circuit 655 to interrupt the holding current through the matrix. This releases the path fired through the matrix. Also, the output of the inverter 661 feeds through the inhibit gate 674 to inhibit the gate 678 and prevent any generation of a firing pulse at amplifier 663 until the next call.

When the paths through the matrix are interrupted, the circuits 517, 521 switch "off" to interrupt the flow of current through points 78*a*, 78*b*. Also the inhibit gate 513 is no longer energized and switch through circuit 80 restores to normal. All equipment has now returned to a normal condition.

SPECIAL FEATURES

Throughout the preceeding description, various assumptions have been made which do not hold true in all cases. Now, the description will explain how the circuit operates under these conditions.

*Executive right-of-way.*—One of the special conditions which can occur is that usually called "Executive Right-of-way." An executive right-of-way is a capability built into some telephone sets which allows the users of those telephone sets to seize a busy line. To accomplish this end, the telephone sets having executive right-of-way capabilities are assigned calling numbers which cause the NOR gate 889 to conduct.

In greater detail, when the calling number of an executive right-of-way phone is stored in the register 84, the flip-flop 848 is switched to remove its output signal from the terminal $\overline{HA}$ and the flip-flop 849 is switched to remove an output signal from terminal HB. NOR gate 889 conducts.

Next, the subscriber, who presumably has previously determined that a line is busy by dialing a called number and receiving a busy signal, dials a first or prefix digit 8. The result is that the NOR gate 893 conducts and energized the middle input of AND gate 887. Finally, the NOR gate 1046 is pulsed from the source 70 as it energizes and deenergizes the point T95, thus stepping the sequence switch to its step "4." While being so stepped, the NOR circuit 1046 applies a signal to the right hand input of AND gate 887. Thus, there is coincidence and the AND gate 887 conducts to pulse a priority flip-flop 954. Responsive thereto, a potential is removed from the output $\overline{X}$, and applied to the output X. Removal of the $\overline{X}$ output causes timer 953 to switch "on" and reset the hundreds register of the called number store 85 and sequence switch 83. (The calling number remains in store 84 due to the blocking effect of diode 1030.) After capacitor 952 charges, and timer 953 switches "off" to remove the reset signal, there is no further reset effect at register 85 and sequence switch 83.

With the sequence switch in its normal condition and the priority flip-flop 954 switched, the lower four input terminals of NOR gate 1042 are deenergized. (On other calls the lowermost input is energized from the $\overline{X}$ side of flip-flop circuit 954.) When point T95 is next deenergized by the source 70, NOR gate 1042 conducts. This steps the sequence switch 83 to step "1," thus sending dial tone and preparing to store the hundreds digits of a called number.

The calling subscriber responds to dial tone by transmitting the called number which is stored in register 85 in the above described manner. From Truth Table II we learn that the $\overline{SC}$ terminal is energized on the steps "1, 2 and 3." Thus, gate 1007 is inhibited at its right hand inhibit terminal until after the entire called number is stored in register 85.

This executive right-of-way call differs from the previously described call, however, because the previous call did not include the prefix digit which operated the flip-flop 954. Thus, during the previous call, the inhibit was never removed from the $\overline{X}$ conductor and the center terminal of the gate 1007. With the prefix digit, gate 1007 is able to conduct when the sequence switch de-energizes its terminal $\overline{SC}$.

The circuit now stands with the called numbers stored in register 85. When next the register scanner 73 reaches the condition which identifies the register. NOR gate 556 conducts and causes the circuit to operate in the above described manner. This time, however, the gate 1007 is not inhibited and a signal is applied to start timer 1009. For a period of time, the left hand input of the firing control NOR gate 1020 is energized to delay the effects of the sequencing switch on step "4." Also, the output of timer 1009 energizes inverter 1031 to hold its input off the lower input to AND circuit 1029. During this delay period while timer 1009 conducts, the flip-flop 1010 is operated to give an output voltage at its unshaded side. It should be noted that the timer 1009 is capacitively coupled to flip-flop 1010 at 1008; therefore, the flip-flop 1010 can turn "on" only once for each timer 1009 output signal.

The output from the unshaded side of the flip-flop 1010 feeds to the middle of NOR gate 1047 which prevents it from switching "on." The output of flip-flop 1010 also energizes the left hand input of an AND gate 1027. There is no immediate effect, however, because the right hand input to AND gate 1027 is energized only during the seventieth time slot in the link scanner output. That time slot is permanently assigned to control executive right-of-way calls. Finally, the output from the flip-flop 1010 energizes (via OR gate 1011) the right hand input of the AND gate 557.

The register scanner continues its operation while timer 1009 energizes an input of NOR gate 1034 to prevent read out of the calling number.

As we shall see, busy tone is about to be sent to the parties talking over the connection to be preempted by executive right-of-way. There is no need to send busy tone to the calling subscriber. He knows that he is preempting the connection.

Nothing further happens until the time slot 70 occurs at which time the input to inverter 1025 is removed to energize the right hand input of AND gate 1027 which conducts and triggers a common preempt amplifier 550. The common amplifier 550 inhibits the switch through hold gate 513 in every link in the office for a period of time equal to the duration of the seventieth time slot. All conversing subscribers are disconnected from each other, but a time slot is such a short period of time that they are not aware of an interruption. During this time period, the paths fired through the matrix are held from the circuits 517, 521. Also, the calling number cannot be read out because the left hand input to NOR gate 1034 is energized from timer 1009. Thus, no path can fire to any link during the "odd" time period which allows a connection to a calling line.

In each link it appears as though the call failed to switch through the matrix. Therefore, all links are scanned until the busy link 40 (FIG. 1) is reached; it has the ability to fire to a single subscriber line. To accomplish this end, the output of the AND gate 1027 is fed through OR gate 1039 to the called number read out bus 920 throughout the entire seventieth time slot. Since the gate 513 is inhibited and the switch through circuits 80 are opened in every link, in the exchange, a path may fire from the busy called subscriber station identified by the read out number through the link to the busy link 40.

With flip-flop 954 on its X side, AND gate 955 conducts during the register time slot to energize the second from right input of NOR gate 733 and the middle inhibit terminal of gate 735. The effect is to fire to a busy called line via the 24V amplifier 730 instead of the 12V amplifier 731. This is because the potential on conductor $\overline{AL}$ during even (called number readout) time slots cannot energize NOR gate 732 since gate 735 is inhibited. This 24 v. pulse over rides lockout in the busy line circuit.

After termination of the seventieth time slot, the AND gate 1027 ceases to conduct and the amplifier 550 switches "off." All switch through circuits 80 in the exchange return to their pre-interrupted condition and busy tone feeds from busy link 40 to both the calling and called parties connected in the preempted call. By this tone the parties know that they must terminate their conversation.

When the path fires from the called subscriber line to the busy link, the common amplifier 532 pulses the flip-flop 1010 which resets to its normal condition. The NOR gate 1047 is no longer held "off" at its middle terminal. Timer 1009, however, continues to hold "off" the NOR gates 1020, 1034. The capacitive coupling 1008 prevents the flip-flop 1010 from again switching "on."

While timer 1009 is applying an output signal, the inverter 1031 is switched "off." Thus, the AND gate 1029 cannot switch "on." This being the case, the pulse from the common amplifier 532 which occurs when a path fires through the matrix to the busy link, cannot reset either the registers 84, 85 or the sequence switch 83.

The circuit stands in the condition described until timer 1009 times out, thus giving the preempted subscribers time enough to complete their call. After timer 1009 times out, the signal disappears at the left hand inputs of NOR gates 1020 and 1034. Each of these NOR gates switches "on" to start the step "4" functions of the sequence switch. The circuit is now in a waiting condition and nothing further happens until an appearance of a time slot which identifies an executive right-of-way release signal.

When the link scanner reaches a executive right-of-way release control time slot, a voltage is removed from both of the conductors 450. The NOR gate 741 conducts. If it is also during the register time slot, conductor RTS is energized and AND gate 743 conducts. Inverter 745 switches "off" to de-energize an input to the NOR gate 1047.

Means are provided for releasing the preempted connection when NOR gate 1047 conducts. Before explaining this in greater detail, it may be well to recall that the line scan is stopped. When the called number is read-out of store 85, signals coinciding on conductors 801 cause the NOR gate 640 in the called line circuit to conduct. When NOR gate 1047 conducts, common amplifier 642 switches "on." Thus, there is coincidence at the input of AND gate 641 in the called line circuit. Then OR gate 653 energizes circuit 654, and circuit 655 releases the preempted path through the matrix. Thereafter, the call is completed as described above.

*Trunk access and restricted service.*—Another special service which may be given to subscribers is trunk access or restricted service. By this service, certain lines may be denied access to distant offices while other lines are given access. Generally speaking, this service is controlled by a series of gates numbered 881–886 and by special strapping selectively applied to terminals 896.

A point to recall is that the first, or hundreds digit of a line number serves level marking purposes. For example, we have already learned how the hundreds digit zero in a called number causes a connection to reach an operator position. In the calling number, a hundreds digit has been explained as giving executive right-of-way. Here, the hundreds digit in both the calling and called numbers are used to give or restrict trunk access.

In greater detail, NOR gates 884–886 are wired into the calling number store circuit 84. Additionally, jumper wires 896 are selectively connected to the inputs of the NOR circuits 884–886. Thus, certain stored, calling number, hundreds digits cause one of the NOR gates 884–886 to switch "on" unless an input potential is permanently applied thereto via restricted service strapping terminals 896. Each of the NOR gates 884–886 connects through an OR gate 883 to the middle input of AND gate 882. Thus, on calls from calling lines identified by conducting NOR gates 884–886, the middle input of AND gate 882 is energized. The right-hand input of AND gate 882 is energized when a "nine" digit appears in the hundreds position of a called number. This "nine" digit must be dialed to gain access to a trunk to a distant office. Finally, the left hand input of AND gate 882 is energized during a register time slot. Therefore, AND gate 882 conducts on calls to distant offices unless the calling subscriber has restricted service.

Inverter 881 normally energizes its output terminal. Therefore, the left hand input of AND gate 744 and the input of a common amplifier 740 are normally energized. If AND gate 882 conducts, inverter 881 switches "off." This switches "off" the amplifier 740 and causes an inverter 736 to switch "on." Also, the amplifier 740 removes a potential from a common trunk seize bus 45 which extends to all trunk circuits, as shown in FIG. 1.

When inverter 736 switches "on," the left hand inhibit terminal of gate 735 and the second from the left input terminal of NOR gate 733 are energized. The effect is that inhibit gate 735 cannot conduct when conductor $\overline{AL}$ is energized. Therefore, the pulse applied to the seize bus 670 must be the 24V output of amplifier 730. This means that the lockout condition of line circuit 76 can be over ridden in both "even" and "odd" link scanner time slots.

Returning to the de-energization of trunk select bus 45, the trunk circuits 37*a*, 37*b* (FIG. 1) are thereby enabled to seize a trunk line 38 extending to a ditsant office. Also, the de-energization of conductor 45 causes NOR gates similar to NOR gates 514, 515 to function in the trunk circuits.

Since the called number did not include the digits, one, two or three, in a hundreds position, the NOR gates 956, 957 do not conduct and AND gate 959 cannot switch "on." Inverter circuit 960 remains "on" and applies a voltage through the left hand input of OR circuit 742. It may be recalled that heretofore during calls, the voltage applied through OR circuit 742 was removed during "even" time slots when called lines were seized. Now, however, the voltage remains continuously at the input of OR gate 742 and, therefore, NOR gate 1033 cannot switch "on." This being the case, the called number cannot be read-out. There is no need to reach a called number because seizure of a trunk circuit automatically connects to an outgoing trunk line 38. Moreover, since inverter 881 is not conducting, the AND gate 744 cannot switch "on." Previously, this AND gate switched "on" when conductor $\overline{AL}$ was energized while the called number was being read out. This being the case, the mddle input to NOR gate 1034 is not energized during "even" time slots. Therefore, the calling number is read out continuously during both "even" and "odd" time slots.

If a subscriber having restricted service attempts to reach the outgoing trunk lines, inverter 881 does not switch "off." The AND gate 744 does conduct when conductor $\overline{AL}$ is energized. Thus, NOR gate 1034 does switch "off" during even time frames and the trunk circuit is prevented from completing a connection to the calling subscriber line. The link and trunk scanner 41 unsuccessfully scans all trunk circuits and then reaches the busy tone link 40. At that point a path is fired to the calling line and busy tone is transmitted to the calling subscriber.

CONCLUSION

From the foregoing it will be apparent that the invention provides a new and improved electronic switching system. Since no link circuit is committed to serve any talking circuit until after both calling and called lines have successfully fired through the matrix, the matrix may have a minimum number of crosspoints. Thus, a high internal blocking factor may be tolerated within the matrix without causing any deterioration in the grade of service furnished by the system. Moreover, the invention combines the best features of time and space switching elements. Thus, the time control afforded by the various scanners allows use of a minimum number of control circuits. After a speech path is completed, talking currents flow over a metallic circuit. This eliminates the complex controls required in other competing electronic switching systems which rely upon time division multiplexing principles. Moreover, special features such as executive right-of-way, restricted service, and the like, may be given on any call without materially increasing the size of the system.

Other advantages will readily occur to those skilled in the art.

While the principles of the invention have been described above in connection with specific apparatus and applications, it is to be understood that this description is made only by way of example and not as a limitation on the scope of the invention.

We claim:

1. An electronic switching telephone system comprising a free running scanner, having line, link, and register scanning sections, a plurality of subscriber lines, each terminated by an associated line circuit, means including said scanner for scanning each of said line circuits for unanswered calling conditions during time slots individually associated with said line circuits, a plurality of registers, means including said scanner for scanning each of said registers for idle register conditions during time slots individually associated with said registers, means for driving said register scanning section one time slot at the completion of each scan of said lines, means responsive jointly to the detection of an unanswered calling condition and an idle register condition for storing a numerical identification of the calling line in said idle register, means for thereafter storing a numerical identification of a called line in said idle register, and means responsive to completion of said last named storage for interconnecting said calling and called lines.

2. The telephone system of claim 1 and a plurality of link circuits, each of said link circuits including said means for inter-connecting said calling and said called lines, means including said scanner for scanning said links, means in said link scanner for seizing one of said links and causing said seized link to attempt to complete a connection between said calling and called lines, means for causing said link scanner to release said one link and seize another of said links if said attempted connection is not completed within a predetermined time period, means for thereafter causing said other link to attempt to complete a connection between said calling and said called lines, and means responsive to completion of said connection between said calling and said called lines for committing a link to serve said completed connection and for releasing said register.

3. The telephone system of claim 1 and means in said register for detecting calls to or from lines requiring special service, and means responsive to detection of said special service calls for performing unique call functions.

4. An electronic switching telephone system comprising a plurality of subscriber lines each terminated by an associated line circuit, free running means for scanning each of said line circuits for unanswered calling conditions during time slots individually associated with said line circuits, a plurality of registers, means for scanning each of said registers for idle register conditions during time slots individually assocated with said registers, said register scanning means being driven one register time slot at the completion of each scan of said lines, thereby allowing all lines to be scanned once for every register time slot, at least one self-seeking crosspoint network for completing connections to and from said lines under control of said registers, said network having a high internal blocking factor, means responsive to the detection of an unanswered calling condition for storing a calling line number in said register, means for storing a called number in said register under control of a calling subscriber, means for stopping the scanning of lines during the time slot of said idle register, means for thereafter repeatedly attempting to complete a connection from said calling line through said network to the called line, and means responsive to a completion of said connection for resuming the scanning of said lines, whereby said internal blocking factor is overcome before resumption of said line scanning.

5. An electronic switching telephone system comprising a plurality of subscriber lines terminated by associated line circuits, free running means for scanning said lines for unanswered calling conditions during time slots which are individual to said line circuits, at least one self-seeking crosspoint network for completing connections between said lines, said network having a high internal blocking factor, means jointly responsive to a calling condition on one of said lines and to the receipt of a called number indication for stopping the scanning of said lines, means for thereafter repeatedly attempting to complete a connection from said calling line through said network to the line identified by said called number, and means responsive to completion of said connection for resuming the scanning of said lines.

6. An electronic switching telephone system comprising a plurality of subscriber lines each terminated by an associated line circuit, free running means for scanning each of said line circuits for unanswered calling conditions during recurring line identifying time slots, at least one self-seeking crosspoint matrix for completing connections to and from said lines, said matrix having a high internal blocking factor, means responsive to the detection of an unanswered calling condition on one of said lines for registering the calling line number, means for thereafter storing a called number indication, means for stopping the scanning of said lines, means for thereafter repeatedly attempting to complete a connection from said calling line through said matrix to the line identified by said called number, means responsive to completion of said connection between said lines for resuming the scanning of said lines, means for detecting calls to or from lines requiring special service, and means responsive to detection of said special service calls for performing unique call functions while said line scanning is stopped.

7. An electronic switching telephone system comprising a plurality of subscriber lines, a plurality of links, and a self-selecting cross-point switching matrix for selectively interconnecting said lines and said links, free running means for scanning each of said lines for unanswered calling conditions during time slots which individually identify said lines, a plurality of registers, means for scanning each of said registers for idle register conditions during time slots individually associated with said registers, said register scanning means being driven one register time slot at the completion of each scan of said lines, means jointly responsive to the detection of an unanswered calling condition, the position of said line scanning means, and an idle one of said registers for storing a calling number in one register, means in said one register for transmitting dial tone to said calling line, means in said one register for receiving and storing digit pulse trains transmitted to said register from said calling line for identifying a called number, means for thereafter stopping the scanning of said lines in the time slot of said one register, means for sequentially selecting idle ones of said links to attempt to complete connections through said matrix for interconnecting the lines identified by said stored numbers, means for committing one of said links to said interconnection only after said connection is completed from the calling line through said matrix to the called line, and means responsive to completion of said connection for resuming the scanning of said lines.

8. The system of claim 7 and means for blocking calls to busy lines, whereby each of said selected links fails to complete said connection, and means effective after the selection of the last of said links for returning busy tone to the calling line.

9. An electronic switching system comprising a plurality of lines, a plurality of links, and a space division switching network of crosspoints for selectively interconnecting said lines and said links, means for sequentially selecting said links to attempt to complete connections through said network for interconnecting selected ones of lines and said links, and means for committing one of said links to said interconnection only after said connection is completed through said network.

10. An electronic switching system comprising a plurality of lines, a plurality of links, and switching means having self-seeking crosspoints for selectively interconnecting said lines and said links, means associated with each of said lines for selectively applying a slow rising pulse form to said switching means to initiate a connection from a line through said crosspoints to a link, means responsive to said application of said pulse for sequentially selecting said links to attempt to complete connections through said switching means for interconnecting selected ones of lines and said links, and means for committing one of said links to said interconnection only after said connection is completed between said lines.

11. An electronic switching system comprising a plurality of subscriber lines, a plurality of links, and switching means for selectively interconnecting said lines and said links, means for identifying said lines by recurring time slots, means responsive to the detection of a calling condition on one of said lines for storing a calling line number identified by the time slot occurring when said calling condition is detected, means for sequentially selecting said links to attempt to complete connections through said switching means for interconnecting at least the line identified by said stored number and said links, and means for committing one of said links to said interconnection only after said line to link connection is completed through said switching means.

12. The system of claim 11 and means responsive to said storing of said calling number for checking to determine whether said calling number is completely stored, means responsive to the detection of a complete storage for allowing said calling number to remain stored, whereby said connection may be completed, and means responsive to the detection of an incomplete storage for cancelling said storage, whereby said connection may not be completed.

13. An electronic switching telephone system comprising a plurality of subscriber lines, a plurality of links, and switching means for selectively interconnecting said lines and said links, a circuit common to said lines and links for controlling the extension of connections through said switching means, means comprising a sequence switch for controlling the operation of said common circuit, thereby establishing a chronological order of circuit functions, means responsive to operation of said sequence switch to indicate a condition near the end of said chronological order for sequentially selecting said links to attempt to complete connections through said switching means, and means for committing one of said links to said connection only after said connection is completed through said switching means.

14. An electronic switching system comprising a plurality of lines and links, means for identifying said lines and links by individually associated time slots, and line identification time slots having a duration of T time, and said links having a space division switching network comprising a duration of 2T time, a plurality of crosspoint switches for selectively interconnecting said lines and links, means effective during the first T time interval of a link identifying time slot for operating said crosspoint switches to interconnect a line and one link, means effective during the second T time interval of said link identifying time slot for operating said crosspoint switches for interconnecting a second line and said one link, and means responsive to completion of the two connections from said lines to said links for thereafter interconnecting said two connections through said one link.

15. An electronic switching system comprising a plurality of lines, registers, and links, there being N number lines, means for identifying said lines, registers and links by individually associated time slots, said line identification time slots having a duration of T time, said register identification time slots having a duration of NT time, and said links having a duration of 2T time, a space division network of a plurality of crosspoint switches for selectively interconnecting said lines, registers and links, means effective during the first T time interval of a link identifying time slot for operating said crosspoint switches under control of one of said registers to interconnect a line and one link, means effective during the second T time interval of said link identifying time slot for operating said crosspoint switches under control of said one register for interconnecting a second line and said one link, and means responsive to completion of the two connections from said lines to said links for thereafter interconnecting said two connections through said one link.

16. An electronic switching system comprising a plurality of lines, registers, and links, there being N number lines, means for identifying said lines, registers and links by individually associated time slots, said line identification time slots having a duration of T time, said register identification time slots having a duration of NT time, and said links having a duration of 2T time, a switching matrix having self-seeking crosspoints for selectively interconnecting said lines and said links, means associated with each of said lines for selectively applying a slow rising pulse form to said matrix to initiate a self-seeking connection from a line through said matrix to a register, means for storing line numbers in said register, means for sequentially selecting said links to attempt to complete connections through said matrix responsive to said application of said pulse for interconnecting selected ones of lines and links, means effective during the first T time interval of a link identifying time slot for operating said crosspoints under control of said stored numbers to interconnect a line and one link, means effective during the second T time interval of said link identifying time slot for operating said crosspoints under control of said stored numbers for interconnecting a second line and said one link, and means for committing one of said links to said interconnections only after said connections are completed through said matrix.

17. An electronic switching system comprising a plurality of lines, registers, and links, there being N number lines, means for identifying said lines, registers and links by individually associated time slots, said line identification time slots having a duration of T time, said register identification time slots having a duration of NT time, and said links having a duration of 2T time, means for terminating each of said subscriber lines by an associated line circuit, means for scanning each of said line circuits for unanswered calling conditions during corresponding T time slots individually associated with said line circuits, a plurality of registers, means for scanning each of said registers for idle register conditions during corresponding NT time slots individually associated with said registers, thereby allowing all lines to be scanned once for every register step, at least one self-seeking crosspoint matrix for completing connections to and from said lines under control of said registers, said matrix having a minimum number of crosspoints thereby causing a high internal blocking factor, means responsive to the detection of an unanswered calling condition for storing a calling line number in the one register then identified by an NT time slot, means for storing a called number in said one register under control of a calling subscriber, means for stopping the scanning of said lines in the next NT time slot that identifies said one register, means effective during the first T time interval of a link identifying time slot for operating said crosspoints under control of said stored calling line number to interconnect a line and one link, means effective during the second T time interval of said link identifying time slot for operating said crosspoints under control of said stored called line number for interconnecting a second line and said one link, and means responsive to completion of the two connections from said lines to said links for thereafter interconnecting said two connections through said one link.

18. An electronic switching system comprising a common source of pulses, said pulses having a wave form whereby adjacent half-cycles have opposite polarity, means comprising a plurality of chains of cascaded flip-flop circuits for generating time slot pulses in binary code form, means for driving one of said chains responsive to the half-cycles of one polarity, means for driving a second of said chains responsive to one particular step in the binary output code of said one chain, at least one decimal store circuit, means comprising a binary to decimal converter for interconnecting the output of said one chain and said decimal store circuit, a plurality of lines, means responsive to each step of said one chain for individually scanning a line identified by that step for an unanswered calling condition on that line, and means responsive to the detection of an unanswered calling condition on one of said lines for pulsing the output of said one chain through said converter to said decimal store, thereby storing an identification of said calling line according to the step in said first chain on which said calling condition occurred.

19. An electronic switching system comprising a plurality of lines, registers, and links, there being N number lines, means for identifying said lines, registers and links by individually associated time slot pulses, said line identification time slots having a duration of T time, said register identification time slots having a duration of NT time, and said links having a duration of 2T time, said identifying means comprising source of pulses, said pulses having a wave form with adjacent half-cycles of opposite polarity, means comprising a plurality of chains of cascaded circuits for generating said time slot pulses in code form, means for driving one of said chains responsive to the half-cycles of one polarity, means for driving a second of said chains responsive to the half-cycles of opposite polarity, means for driving a third of said chains responsive to one particular step in the output code of said one chain, at least one digital store circuit in said register, means comprising a converter circuit for interconnecting the output of said one chain and said digital store circuit, means responsive to each step of said one chain for individually scanning a line identified by that step for an unanswered calling condition on that line, a plurality of spaced apart switches for selectively interconnecting said lines, registers and links, means responsive to the detection of an unanswered calling condition on one of said lines for operating said switches to interconnect said one line and said digital store circuit, means for pulsing the output of said one chain through said converter to said digital store circuit, thereby storing an identification of said calling line according to the step in said first chain on which said calling condition occurred, means effective during the first T time interval of a link identifying time slot for operating said spaced apart switches to interconnect said one line and one link, means effective during the second T time interval of said link identifying time slot for operating said spaced apart switches for interconnecting a second line and said one link, and means responsive to completion of the two connections from said lines to said one link for thereafter interconnecting said two connections through said one link.

20. An electronic switching system comprising a plurality of lines, registers and links, there being N number lines, means for identifying said lines, registers and links by individually associated time slot pulses, said lines identification time slots having a duration of T time, said register identification time slots having a duration of NT time, and said links having a duration of 2T time, said identifying means comprising a source of pulses having a wave form with adjacent half-cycles of opposite polarity, first means for generating said line identifying time slots responsive to the half-cycles of one polarity, second means for generating said link identifying time slots responsive to the half-cycles of opposite polarity, means responsive to each step of said first means for individually scanning a line identified by that step for an unanswered calling condition on that line, a space division network comprising a plurality of crosspoint switches for selectively interconnecting said lines, registers and links, means responsive to the detection of an unanswered calling condition on one of said lines for operating said switches to interconnect said line and one of the registers, means for pulsing the output of said first means into said register, thereby storing an identification of said calling line according to the step of said first means on which said calling condition occurred, means effective during the first T time interval of a link identifying time slot for operating said crosspoint switches to attempt to interconnect said line and one link, means effective during the second T time interval of said link identifying time slot for operating said crosspoint switches to attempt to interconnect a second line and said one link, means responsive to completion of the two connections from said lines to said one link for thereafter interconnecting said two connections through said one link, and means responsive jointly to said second means and to a failure to complete said two connections for causing another link to attempt to complete said connections.

21. The system of claim 20 and means for detecting a failure of said register to store said identification of said calling line when pulsed, means responsive to said detection means for releasing said one register when said identification is not stored, and means thereafter responsive the next of said NT time slots for selecting another of said registers when said output of said first means is again pulsed.

22. An electronic switching system comprising a plurality of lines, a plurality of links, means for selectively interconnecting said lines and said links, a plurality of digital store circuits for controlling said interconnecting means, means for identifying each of said lines by signals defining recurring time slots, means for selectively storing in one of said store circuits an identity of one of said lines by pulsing one of said digital store circuits responsive to a signal defining a particular time slot, means comprising said links for sequentially attempting to complete connections through said interconnecting means from the one of lines identified in said store circuit to another of said lines, and means for committing one of said links only after said connection is completed between said lines and through said interconnection means.

23. The system of claim 22 and means for detecting a failure of said one digital store circuit to store said identity of said one line, means responsive to said detection means for releasing said one store circuit when said identity is not stored, and means thereafter responsive to reoccurrence of said particular time slot for selecting another of said digital store circuits to store said identity of said one line.

24. An electronic switching telephone system comprising a plurality of subscriber lines, a plurality of links, and switching means for selectively interconnecting said lines and said links, a common source of pulses, said pulses having a wave form with half-cycles of opposite polarity, means comprising a plurality of chains of cascaded circuits for generating time slot pulses for identifying at least said lines and said links, means for driving one of said chains responsive to the half-cycles of one polarity, means for driving a second of said chains responsive to the half-cycles of opposite polarity, means for driving a third of said chains responsive to one step in the output of said one chain, at least one digital store circuit, means responsive to the output of said third chain for effectively interconnecting the output of said one chain and said one store circuit, means responsive to each step of said one chain for scanning a corresponding line for unanswered calling condition, means responsive to the detection of an unanswered calling condition for pulsing the output of said one chain into said store circuit during a particular step in the output of said third chain, thereby storing an identification of calling line according to the step in said first chain on which said calling condition occurred, means comprising said second chain for sequentially selecting said links to attempt to complete connections through said switching means for interconnecting the line identified by said stored identification and one of said links, and means for committing a link to said interconnection with said line only after said connection is completed through said switching means.

25. The system of claim 24 there being a plurality of said store circuits, means responsive to a particular step of the output of said third chain for selecting one of said store circuits when said output of said one chain is pulsed into storage, and means responsive to a recurrence of said particular step in the output of said third chain for operating said link selecting means.

26. The system of claim 24 and means for detecting a failure of said one store circuit to store said output of said one chain when pulsed, means responsive to said detection means for releasing said one store circuit when said output of said chain is not stored, and means thereafter responsive to the next step of said third chain for selecting another store circuit when said output of said one chain is again pulsed into storage.

27. The system of claim 24 in which there N number lines, means whereby the output of said one chain has a duration of T time, the output of said third chain has a duration of NT time, and the output of said second chain has a duration of 2T time, said switching means comprises a space division network of a plurality of crosspoint switches for selectively interconnecting said lines, store cicuits, and links, means effective during a first T time interval of one step in the output of said second chain for operating said crosspoint switches to interconnect the line identified by said stored identification and one link, means effective during the second T time interval of said one step in the output of said second chain for operating said crosspoint switches for interconnecting a second line and said one link, and means responsive to completion of the two connections from said lines to said links for thereafter interconnecting said two connections through said one link.

28. A line circuit for use in an electronic switching telephone system comprising means responsive to a calling condition in said system for applying a signal to initiate switching through said system, means responsive to the completion of a first switching path through said system for placing said line circuit in lockout, means comprising a bus common to line circuits of said system for applying seize signals to all said line circuits when connections are extended to any of said line circuits, means for applying a first type signal to said bus for over-riding lockout signals when a line connected to a completed switch path is to be seized, and means for applying a second type non-lockout over riding signal to said bus for seizing line circuits not in lockout condition and precluding seizure when a line connected to a completed switch path is not to be seized, whereby line circuits appear busy if in lockout when said second type signal occurs.

29. The line circuit of claim 28 and means responsive to calling conditions for applying said first type signal to said bus, and means responsive to celled conditions for applying said second type signal to said bus, whereby lockout conditions on calling lines are over-ridden but lockout conditions on called lines are not over-ridden.

30. The line circuit of claim 29 and pre-empting means for selectively applying said first type signal to said common bus when a busy called line is selected to over-ride said busy condition, thereby giving executive right-of-way service.

31. An electronic switching telephone system comprising a plurality of subscriber lines, a plurality of links, and switching means for selectively interconnecting said lines and said links, a line circuit terminating each of said lines, means responsive to a calling condition for applying a signal at the line circuit of calling line requesting a switch path through said system, means for thereafter placing said line circuit of said calling line in lockout, means comprising a bus common to a said line circuits for applying seize signals to all line circuits, means for applying a first type seize signal to said bus for over-riding lockout conditions, means in said line circuit of said calling line for responding to said first type seizure signal, means for applying a second type non-lockout over-riding seize signal to said bus, and means in the line circuit of a called line for responding to said second type of seizure signal, whereby line circuits of called lines are marked busy since their lockout is not over-ridden when said second type signal occurs, link scan means for sequentially selecting said links to attempt to complete connections through said switching means for interconnecting said calling and called lines and said links, and means for committing one of said links to said interconnection only after said connection is completed through said switching means.

32. The system of claim 31 and means for selectively applying said first type signal to said common bus when a busy called line is selected, thus over-riding said busy condition to give executive right-of-way.

33. The system of claim 31 and means responsive to completion of the cycle of said link scan means without completion of said interconnection for sending busy tone to said calling line.

34. An electronic switching system comprising a plurality of lines, registers, and links there being N number lines, means for identifying said lines, registers and links by individually associated time slots, said line identification time slots having a duration of T time, said register identification time slots having a duration of NT time, and said links having a duration of 2T time, a space division network comprising a plurality of crosspoint switches for selectively interconnecting said lines, registers and links, a line circuit terminating each of said lines, means responsive to a calling condition on one of said lines for operating said switches to connect said one line and the one register then identified by an existing NT time slot, means responsive to the completion of a path through said switches for placing said line circuit in lockout, means comprising a bus common to said line circuits for applying seize signals to all line circuits, means for applying a first type seize signal to said bus for over-riding lockout signals, means in the calling line circuit operated under control of said one register for responding to said first type seizure signal, means for applying a second type non-lockout over-riding seize signal to said bus, whereby called line circuits appear busy if in lockout when said second type signal occurs, means in the called line circuit operated under control of said register for responding to said second type seizure signal if said called line is not busy, means effective during the first T time interval of a link identifying time slot for applying said first type signal to said bus for operating said crosspoint switches to interconnect a calling line and one link, means effective during the second T time interval of said link identifying time slot for applying said second type signal to said bus for operating said crosspoint switches to interconnect a called line and said one link, and means responsive to completion of the two connections from said lines to said links for thereafter interconnecting said two connections through said one link.

35. The system of claim 34 and means for selectively applying said first type signal to said common bus when a busy called line is selected, thus over-riding said busy condition to give executive right-of-way.

36. An electronic switching telephone system comprising a plurality of subscriber lines, each terminated by an associated line circuit, free running scanner drive means, means responsive to said drive means for scanning each of said line circuits for unanswered calling conditions during time slots which individually identify said line circuits, means responsive to an unanswered calling condition on a line for applying a switching path request signal at the line circuit terminating said calling line, a plurality of registers, means for scanning each of said registers for idle register conditions during time slots individually associated with said registers, said register scanning means being driven one register time slot at the completion of each scan of said lines, means responsive jointly to an unanswered calling condition and an idle one of said registers condition for completing said requested path from said calling line to said one register, means in said one register for storing a numerical identification of said calling line responsive to the output of said scanning means when said calling condition occurred, means for thereafter storing in said register a numerical identification dialed by a calling subscriber to identify a called line, a plurality of link circuits, each of said link circuits including said means for completing connections between said calling line and said called lines, a link scanner controlled by said drive means, means in said link scanner for seizing one of said links and causing said seized link to sequentially attempt to complete a connection first between said calling line and said seized link and then said called line and said seized link, means for causing said link scanner to release said seized link and to seize another of said links if said attempted connection is not completed within a predetermined period of time, means for thereafter causing said other link to attempt to complete a connection between said calling and said called lines, means also responsive to the completion of said path for placing said calling line circuit in lockout, means comprising a bus common to said line circuits for applying seize signals to all line circuits, means for applying a first type seize signal to said bus for over-riding lockout conditions while said links are attempting to complete said connections to calling lines, means for applying a second type non-lockout over-riding seize signal to said bus while said link circuits are attempting to complete connections to called lines whereby line circuits appear busy if in lockout when said second type signal occurs, and means in said register for causing the line circuits identified by said stored identifications to respond to said seize signals.

37. The system of claim 36 and means controlled by certain of said stored identifications for selectively applying said first type signal to said common bus when a busy called line is selected thereby over-riding said busy condition to give executive right-of-way.

38. The system of claim 36 and means responsive to completion of said connection between said calling and said called lines for committing a link to serve said completed connection and for releasing said register.

39. The system of claim 36 and a plurality of trunks to distant offices, means for restricting selected ones of said lines from access to said trunks and means for giving other of said lines access to said trunks.

40. The system of claim 39 and means whereby said restriction and access to said trunks is given responsive to said stored identifications.

41. An electronic switching telephone system comprising a plurality of lines, registers, and links, there being N number lines each terminated by an associated line circuit, means for identifying said lines, registers and links by individually associated time slots, said line identification time slots having a duration of T time, said register identification time slots having a duration of NT time, and said links having a duration of 2T time, free running means for scanning each of said line circuits for unanswered calling conditions during said T duration line identifying time slots, at least one self-seeking crosspoint matrix for completing connections to and from said lines, said matrix having a high internal blocking factor, means responsive jointly to the detection of an unanswered calling condition on one of said lines for registering the calling line number in the one register then identified by an NT time slot, means for thereafter storing a called line number indication in said one register, means for stopping the scanning of said lines, each line circuit comprising means responsive to the completion of a path from said line circuit through said matrix for placing said line circuit in lockout, means comprising a bus common to said line circuits for applying seize signals to all line circuits, means for applying a first type signal to said line circuits for over-riding lockout signals, means for applying a second type non-lockout over-riding seize signal to said bus, means effective during the first T time interval of a link identifying time slot for operating said crosspoints under control of said stored calling line number and for applying said first type signal to said bus to interconnect the calling line and one link, means effective during the second T time interval of said link identifying time slot for operating said crosspoints under control of said stored called line number and for applying said second type signal to said bus for interconnecting the called line and said one link, and means responsive to completion of the two connections from said lines to said links for thereafter interconnecting said two connections through said one link, for releasing said one register, and for resuming said line scanning.

No references cited.

ROBERT H. ROSE, *Primary Examiner.*

WILLIAM C. COOPER, *Examiner.*